US009385809B2

(12) United States Patent
Cho et al.

(10) Patent No.: US 9,385,809 B2
(45) Date of Patent: Jul. 5, 2016

(54) OPTICAL INTERFACE MODULE FOR COHERENT RECEPTION, OPTICAL MEMORY MODULE, AND OPTICAL MEMORY SYSTEM COMPRISING SAME

(71) Applicant: SAMSUNG ELECTRONICS CO., LTD., Suwon-Si, Gyeonggi-Do (KR)

(72) Inventors: Keun-Yeong Cho, Suwon-si (KR); Ho-CHul Ji, Yongin-si (KR); Gi-Tae Jeong, Seoul (KR); Kyoung-Ho Ha, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/488,653

(22) Filed: Sep. 17, 2014

(65) Prior Publication Data
US 2015/0207563 A1 Jul. 23, 2015

(30) Foreign Application Priority Data
Jan. 21, 2014 (KR) .................. 10-2014-0007035

(51) Int. Cl.
*H04B 10/25* (2013.01)
*H04B 10/40* (2013.01)
*H04J 14/02* (2006.01)

(52) U.S. Cl.
CPC ............ *H04B 10/2503* (2013.01); *H04B 10/40* (2013.01); *H04J 14/02* (2013.01)

(58) Field of Classification Search
CPC .. H04B 10/2503; H04B 10/29; H04B 10/142; H04B 10/40; H04B 10/61–10/64; H04B 10/2587
See application file for complete search history.

(56) References Cited

U.S. PATENT DOCUMENTS

| 7,613,026 B2 | 11/2009 | Lee et al. | |
|---|---|---|---|
| 8,428,459 B2 | 4/2013 | Park et al. | |
| 2005/0078902 A1* | 4/2005 | Beausoleil | B82Y 20/00 385/1 |
| 2005/0147414 A1 | 7/2005 | Morrow et al. | |
| 2007/0154221 A1* | 7/2007 | McNicol | H04B 10/50 398/135 |
| 2007/0159369 A1* | 7/2007 | Currie | H03M 1/74 341/144 |
| 2008/0222351 A1 | 9/2008 | Verdiell et al. | |
| 2012/0070149 A1 | 3/2012 | Chung et al. | |
| 2012/0148265 A1 | 6/2012 | Chang et al. | |
| 2012/0224846 A1 | 9/2012 | Swanson et al. | |

(Continued)

FOREIGN PATENT DOCUMENTS

| JP | 2013-081186 A | 5/2013 |
|---|---|---|
| KR | 10-1003028 | 12/2010 |

(Continued)

*Primary Examiner* — David Payne
*Assistant Examiner* — Casey Kretzer
(74) *Attorney, Agent, or Firm* — Volentine & Whitt, PLLC

(57) ABSTRACT

An optical memory module comprises one or more memory devices configured to store data, and one or more optical interface modules configured to perform optical communication between the memory devices and an external device. Each of the optical interface modules comprises an input-output light distribution unit configured to divide received light to produce transmission light and reception light, an electrical-to-optical conversion unit configured to perform optical modulation based on the transmission light and an electrical transmission signal to generate an optical transmission signal, and a coherent optical-to-electrical conversion unit configured to perform a coherent reception based on the reception light and an optical reception signal to generate an electrical reception signal.

18 Claims, 29 Drawing Sheets

(56) References Cited

U.S. PATENT DOCUMENTS

2013/0101300 A1 4/2013 Weisser et al.
2013/0287410 A1 10/2013 Leven et al.

FOREIGN PATENT DOCUMENTS

| KR | 1020110060429 A | 6/2011 |
| KR | 2013-0007624 | 1/2014 |

* cited by examiner

OPTICAL INTERFACE MODULE FOR COHERENT RECEPTION, OPTICAL MEMORY MODULE, AND OPTICAL MEMORY SYSTEM COMPRISING SAME

CROSS-REFERENCE TO RELATED APPLICATIONS

This application claims priority under 35 USC §119 to Korean Patent Application No. 10-2014-0007035 filed on Jan. 21, 2014, the disclosure of which is hereby incorporated by reference in its entirety.

BACKGROUND OF THE INVENTION

The inventive concept relates generally to optical communication, and more particularly to an optical interface module for a coherent reception, an optical memory module, and optical memory system comprising the optical interface module.

As operational speeds of semiconductor devices increase, the speed of communication buses should increase accordingly to support higher-speed communication from those devices. For example, the operational speed of memory buses may be required to increase to facilitate communication between high-speed memory controllers and high speed memory devices. Where a memory bus is implemented with an electrical channel, undesired effects such as signal distortion, noise, delay, etc., may decrease reliability and/or limit the operational speed.

To avoid the limits of electrical channels, researchers are developing optical communication buses using optical channels. Optical communication buses may increase the speed and reliability of transferred data because optical signals experience less interference than electrical signals. In implementing high-speed and/or high-capacity memory systems, the number of light sources may increase with the number of the memory modules that are optically-connected to a memory controller. The increase in light sources may increase manufacturing costs and power consumption, which can limit the number of memory modules that can be included in a memory system.

SUMMARY OF THE INVENTION

In one embodiment of the inventive concept, an optical memory module comprises one or more memory devices configured to store data, and one or more optical interface modules configured to perform optical communication between the memory devices and an external device. Each of the optical interface modules comprises an input-output light distribution unit configured to divide received light to produce transmission light and reception light, an electrical-to-optical conversion unit configured to perform optical modulation based on the transmission light and an electrical transmission signal to generate an optical transmission signal, and a coherent optical-to-electrical conversion unit configured to perform a coherent reception based on the reception light and an optical reception signal to generate an electrical reception signal.

In another embodiment of the inventive concept, an optical memory system comprises at least one light source configured to generate light, one or more memory modules configured to store data, and a memory controller configured to control the memory modules. Each of the memory modules comprises one or more optical interface modules configured to perform optical communication between the corresponding memory module and the memory controller, using the light from the light source. Each of the optical interface modules comprises an input-output light distribution unit configured to divide received light to produce transmission light and reception light, an electrical-to-optical conversion unit configured to perform optical modulation based on the transmission light and an electrical transmission signal to generate an optical transmission signal, and a coherent optical-to-electrical conversion unit configured to perform coherent reception based on the reception light and an optical reception signal to generate an electrical reception signal.

In another embodiment of the inventive concept, an optical interface module comprises an input-output light distribution unit configured to divide received light to produce transmission light and reception light, an electrical-to-optical conversion unit configured to perform optical modulation based on the transmission light and an electrical transmission signal to generate an optical transmission signal, and a coherent optical-to-electrical conversion unit configured to perform a coherent reception based on the reception light and an optical reception signal to generate an electrical reception signal.

These and other embodiments of the inventive concept can potentially reduce the number of light sources to be used for optical communication, allowing relatively efficient optical communication of low power and high reliability to be performed without increasing system size and design burden.

BRIEF DESCRIPTION OF THE DRAWINGS

The drawings illustrate selected embodiments of the inventive concept. In the drawings, like reference labels indicate like features.

DETAILED DESCRIPTION

Embodiments of the inventive concept are described below with reference to the accompanying drawings. These embodiments are provided as teaching examples and should not be construed to limit the scope of the inventive concept.

In the description that follows, the terms first, second, third etc., may be used to describe various features, but these features should not be limited by these terms. Rather, these terms are used merely to distinguish one feature from another. Thus, a first feature discussed below could be termed a second feature, and vice versa, without departing from the teachings of the inventive concept. As used herein, the term "and/or" includes any and all combinations of one or more of the associated listed items.

Where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. Other words used to describe the relationship between elements should be interpreted in a like fashion (e.g., "between" versus "directly between," "adjacent" versus "directly adjacent," etc.).

The terminology used herein is for the purpose of describing embodiments only and is not intended to be limiting of the inventive concept. As used herein, the singular forms "a," "an" and "the" are intended to include the plural forms as well, unless the context clearly indicates otherwise. Terms such as "comprises" and/or "comprising," where used in this specification, indicate the presence of stated features but do not preclude the presence or addition of one or more other features.

Unless otherwise defined, all terms (including technical and scientific terms) used herein have the same meaning as commonly understood by one of ordinary skill in the art to which this inventive concept belongs. Terms such as those defined in commonly used dictionaries should be interpreted as having a meaning that is consistent with their meaning in the context of the relevant art and will not be interpreted in an idealized or overly formal sense unless expressly so defined herein.

Figure 1:
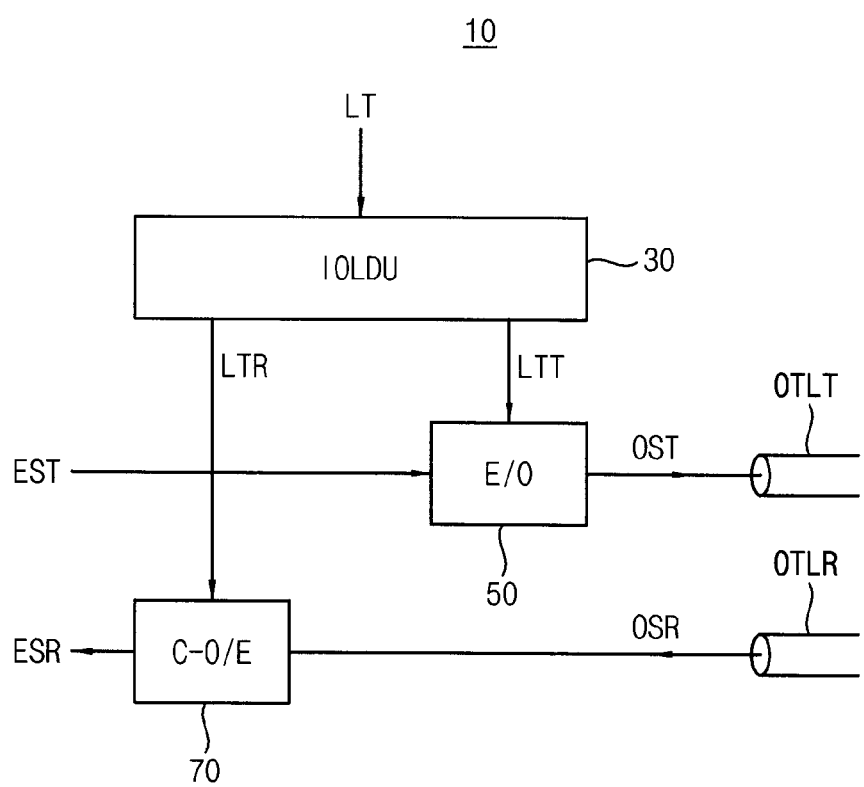
FIG. 1 is a block diagram illustrating an optical interface module according to an embodiment of the inventive concept.

FIG. 1 is a block diagram illustrating an optical interface module 10 according to an embodiment of the inventive concept.

Referring to FIG. 1, optical memory module 10 comprises an input-output light distribution unit (IOLDU) 30, an electrical-to-optical conversion unit (E/O) 50 and a coherent optical-to-electrical conversion unit (C-O/E) 70.

Input-output light distribution unit 30 divides received light LT to produce transmission light LTT and reception light LTR. Input-output light distribution unit 30 may be a passive element such as an optical splitter or an active element such as an optical switch. Input-output light distribution unit 30 may have a configuration similar to a global light distribution as described with reference to FIGS. 7 through 13.

Electrical-to-optical conversion unit 50 performs optical modulation based on transmission light LTT and electrical transmission signal EST to generate an optical transmission signal OST. C-O/E 70 performs a coherent reception based on reception light LTR and an optical reception signal OSR to generate an electrical reception signal ESR. Received light LT, the divided transmission and reception lights LTT and LTR are continuous waves (CWs) that are not modulated. Electrical-to-optical conversion unit 50 selectively outputs transmission light LTT, that is, the continuous wave, according to logic levels of electrical transmission signal EST, to generate optical pulses as optical transmission signal OST corresponding to logic levels of electrical transmission signal EST. C-O/E 70 is described with reference to FIGS. 2 and 3.

Optical transmission signal EST, optical transmission signal OST, electrical reception signal ESR, and optical reception signal OSR may be multi-bit signals. Each of transmission light LTT and reception light LTR may be divided into multiple beams corresponding to the bit number of the transferred signal. As described below, electrical-to-optical conversion unit 50 may include one or more optical modulators such that each optical modulator generates each bit of optical transmission signal OST based on transmission light LTT and each bit of electrical transmission signal EST. C-O/E 70 comprises one or more coherent receivers such that each coherent receiver may generate each bit of electrical reception signal ESR based on reception light LTR and each bit of optical reception signal OSR.

As illustrated in FIG. 1, electrical-to-optical conversion unit 50 may be coupled to a first unidirectional channel OTLT to output optical transmission signal OST to first unidirectional channel OTLT, and C-O/E 70 may be coupled to a second unidirectional channel OTLR to receive optical reception signal OSR from second unidirectional channel OTLR.

As such, optical interface module 10 does not require a conventional local oscillating light source for the coherent reception, but optical interface module 10 may perform the coherent reception of high sensitivity by dividing the light for the optical modulation. Thus the number of light sources may be reduced and relatively efficient optical communication of low power and high reliability may be performed without increasing system size and design burden.

Figure 2:
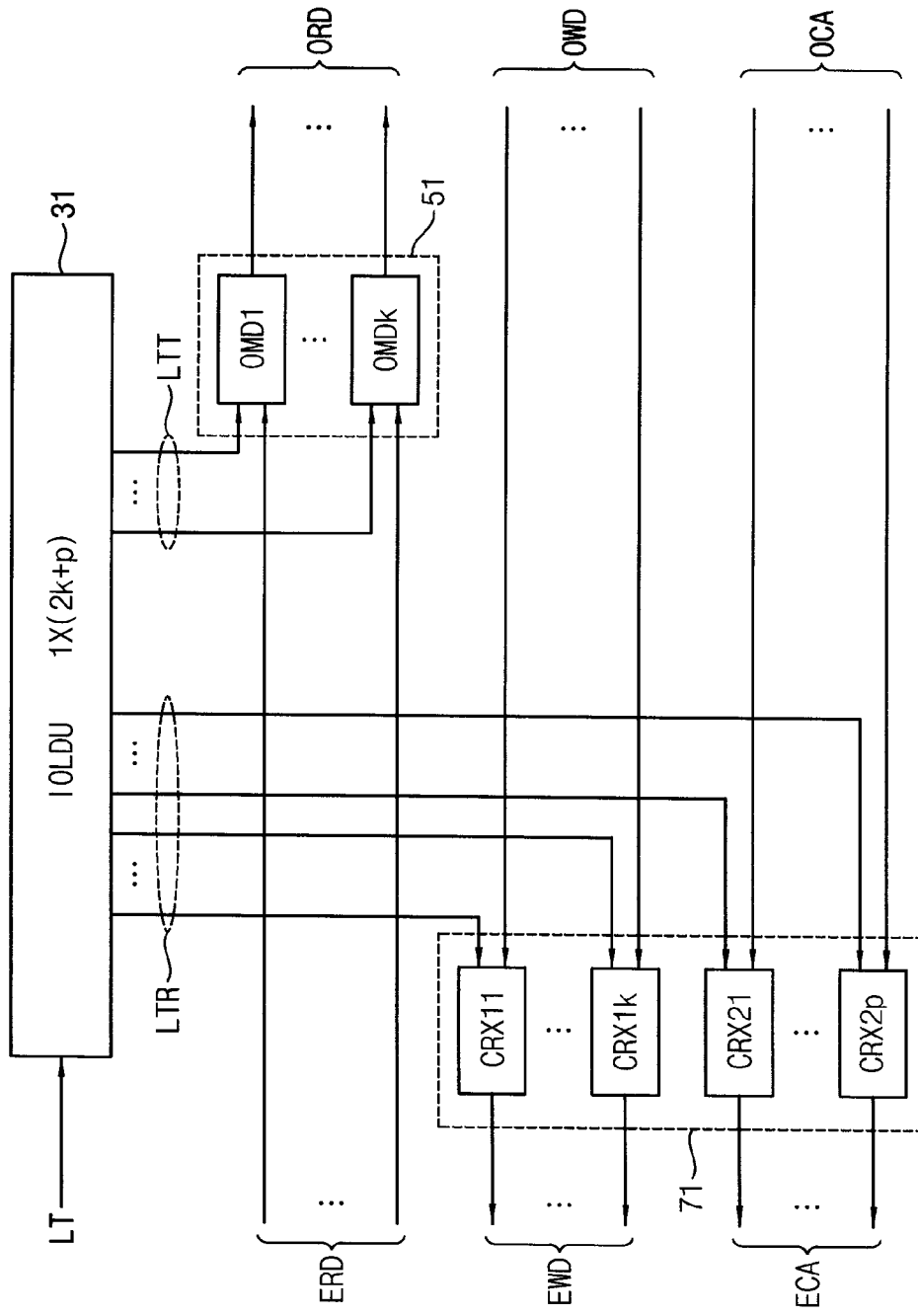
FIG. 2 is a diagram illustrating an optical interface module for a memory system according to an embodiment of the inventive concept.

FIG. 2 is a diagram illustrating an optical interface module 11 for a memory system according to an embodiment of the inventive concept.

Referring to FIG. 2, optical interface module 11 comprises an IOLDU 31, an electrical-to-optical conversion unit 51 and a C-O/E 71.

Input-output light distribution unit 31 divides received light LT to produce transmission light LTT and reception light LTR. Electrical-to-optical conversion unit 51 performs optical modulation based on transmission light LTT and an electrical read data signal ERD corresponding to electrical transmission signal EST to generate an optical read data signal ORD corresponding to optical transmission signal OST. C-O/E 71 performs coherent reception based on reception light LTR and an optical write data signal OWD and an optical command-address signal OCA corresponding to optical reception signal OSR to generate an electrical write data signal EWD and an electrical command-address signal ECA corresponding to electrical reception signal ESR.

Optical interface module 11 is configured to perform optical communication to exchange data with a memory controller. For the optical communication, electrical-to-optical conversion unit 51 comprises k optical modulators OMD1~OMDk configured to generate the k-bit optical read data signal ORD based on transmission light LTT and the k-bit electrical read data signal ERD, where k is a positive integer. C-O/E 71 comprises k coherent receivers CRX11~CRX1k configured to generate the k-bit electrical write data signal EWD based on reception light LTR and the k-bit optical write data signal OWD.

Each of optical modulators OMD1~OMDk may selectively output each beam of transmission light LTT, that is, the continuous wave, according to logic levels of each bit of the electrical read data signal ERD, to generate optical pulses as each bit of the optical read data signal ORD corresponding to logic levels of each bit of the electrical read data signal ERD. As such, data ERD that are read from the memory device may be transferred to the memory controller as optical signal ORD.

In addition, optical interface module 11 is configured to perform optical communication to receive commands and addresses from the memory controller. For optical communication, C-O/E 71 may further comprise p coherent receivers CRX21~CRX2p configured to generate the p-bit electrical command-address signal ECA based on reception light LTR and the p-bit optical command-address signal OCA, where p is a positive integer.

As such, where data is transferred as the k-bit optical signals ORD and OWD and commands and addresses are transferred as the p-bit optical signal OCA, input-output light distribution unit 31 comprises an optical splitter configured to divide received light LT into 2k+p divided lights to provide the 2k+p divided lights to the k optical modulators OMD1~OMDk and the k+p coherent receivers CRX11~CRX1k and CRX21~CRX2p, respectively.

Figure 3:
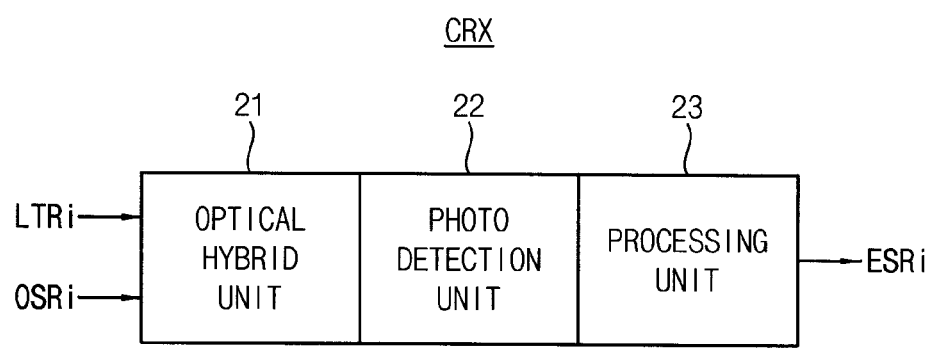
FIG. 3 is a block diagram illustrating an example of a coherent receiver in the optical interface module of FIG. 2.

FIG. 3 is a block diagram illustrating an example of a coherent receiver in the optical interface module of FIG. 2.

Referring to FIG. 3, each coherent receiver CRX comprises an optical hybrid unit 21, and photo-detection unit 22, and a processing unit 23. Optical hybrid unit 21 combines one divided reception light LTRi and one-bit optical reception signal OSRi to produce a combined optical signal. Photo-detection unit 22 comprises a photo-diode configured to convert the combined optical signal to an electrical signal. Processing unit 23 processes the electrical signal in various ways to provide one-bit electrical reception signal ESRi corresponding to the one-bit optical reception signal OSRi.

A signal of low power may be received by inputting a local oscillating signal of high power in addition to the signal of low power to a photo-detector, according to the coherent reception technique. The sensitivity of the coherent receiver is up to about 300 times (i.e., about 25 dB) higher than the direct receiver, and thus the power of the input signal may be reduced significantly. The optical interface module does not require a conventional local oscillating light source for the coherent reception, but the optical interface module may perform the coherent reception of high sensitivity by dividing the light for the optical modulation. Thus the number of light sources may be reduced and relatively efficient optical communication of low power and high reliability may be performed without increasing system size and design burden.

Figure 4:
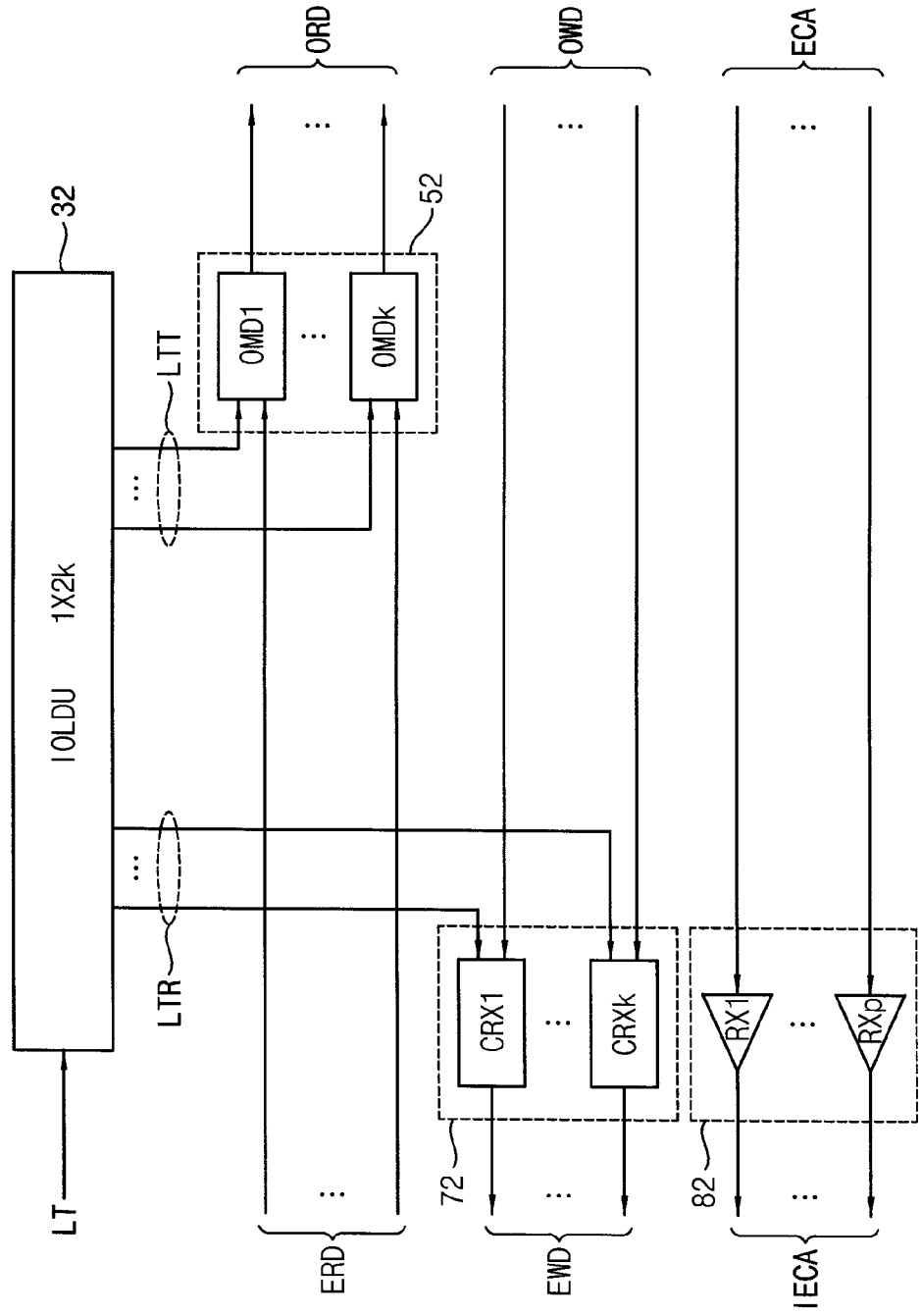
FIG. 4 is a diagram illustrating an optical interface module for a memory system according to an embodiment of the inventive concept.

FIG. 4 is a diagram illustrating an optical interface module 12 for a memory system according to an embodiment of the inventive concept.

Referring to FIG. 4, optical interface module 12 comprises an IOLDU 32, an electrical-to-optical conversion unit 52 and a C-O/E 72.

Input-output light distribution unit 32 divides received light LT to produce transmission light LTT and reception light LTR. Electrical-to-optical conversion unit 52 performs optical modulation based on transmission light LTT and an electrical read data signal ERD corresponding to electrical transmission signal EST to generate an optical read data signal ORD corresponding to optical transmission signal OST. C-O/E 72 performs coherent reception based on reception light LTR and an optical write data signal OWD corresponding to optical reception signal OSR to generate an electrical write data signal EWD corresponding to electrical reception signal ESR.

Optical interface module 12 performs optical communication to exchange data with a memory controller. For the optical communication, electrical-to-optical conversion unit 52 comprises k optical modulators OMD1~OMDk configured to generate the k-bit optical read data signal ORD based on transmission light LTT and the k-bit electrical read data signal ERD, where k is a positive integer. C-O/E 72 comprises k coherent receivers CRX1~CRXk configured to generate the k-bit electrical write data signal EWD based on reception light LTR and the k-bit optical write data signal OWD.

Each of optical modulators OMD1~OMDk may selectively output each beam of transmission light LTT, that is, the continuous wave, according to logic levels of each bit of electrical read data signal ERD, to generate optical pulses as each bit of optical read data signal ORD corresponding to logic levels of each bit of electrical read data signal ERD. As such, data ERD that are read from the memory device may be transferred to the memory controller as optical signal ORD.

In addition, optical interface module 12 is configured to perform electrical communication to receive commands and addresses from the memory controller. For the electrical communication, optical interface module 12 further comprises an electrical reception unit 82. Electrical reception unit 82 comprises p reception buffers RX1~RXp configured to receive the p-bit electrical command-address signal ECA that is transferred through an electrical channel to provide a buffered signal IECA, where p is a positive integer.

As such, where the data is transferred as the k-bit optical signals ORD and OWD and the commands and addresses are transferred as the p-bit electrical signal ECA, input-output light distribution unit 32 comprises an optical splitter configured to divide received light LT into 2k divided lights to provide the 2k divided lights to the k optical modulators OMD1~OMDk and the k coherent receivers CRX1~CRXk, respectively.

Figure 5:
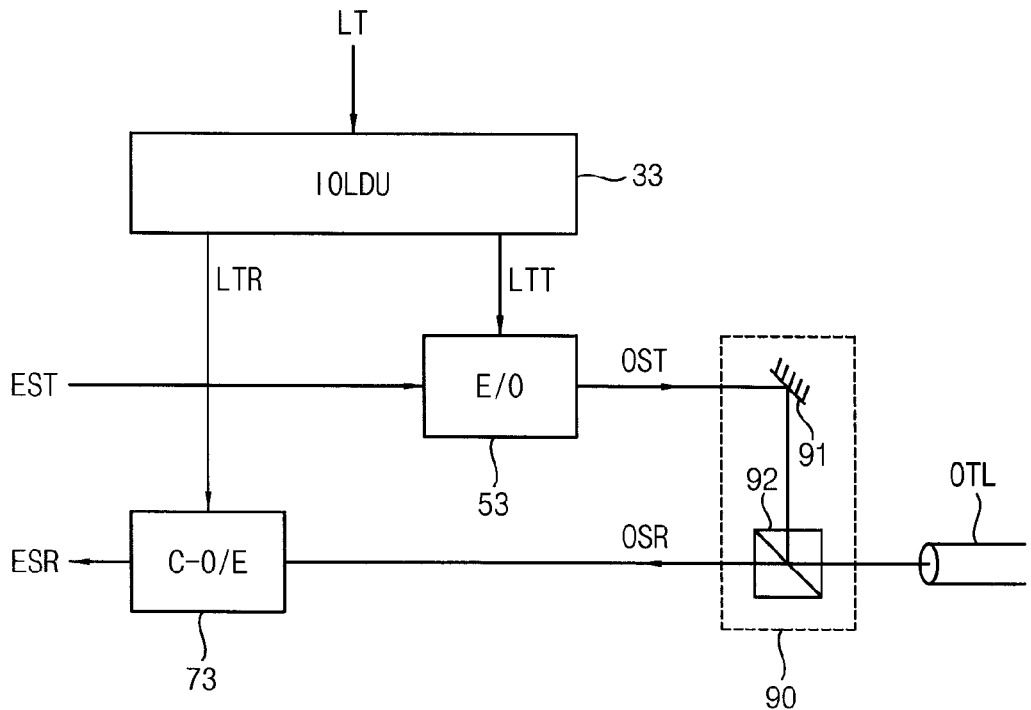
FIG. 5 is a block diagram illustrating an optical interface module according to an embodiment of the inventive concept.

FIG. 5 is a block diagram illustrating an optical interface module 13 according to an embodiment of the inventive concept.

Referring to FIG. 5, optical memory module 13 comprises an IOLDU 33, an electrical-to-optical conversion unit (E/O) 53, and a C-O/E 73.

Input-output light distribution unit 33 divides received light LT to produce transmission light LTT and reception light LTR. Input-output light distribution unit 33 may be a passive element such as an optical splitter or an active element such as an optical switch. Input-output light distribution unit 33 may have a configuration similar to a global light distribution as described with reference to FIGS. 7 through 13.

Electrical-to-optical conversion unit 53 performs optical modulation based on transmission light LTT and an electrical transmission signal EST to generate an optical transmission signal OST. C-O/E 73 performs a coherent reception based on reception light LTR and an optical reception signal OSR to generate an electrical reception signal ESR. Received light LT, the divided transmission and reception lights LTT and LTR are continuous waves (CWs) that are not modulated. Electrical-to-optical conversion unit 53 selectively outputs transmission light LTT, that is, the continuous wave, according to logic levels of electrical transmission signal EST, to generate optical pulses as optical transmission signal OST corresponding to logic levels of electrical transmission signal EST. C-O/E 73 is the same as described with reference to FIGS. 2 and 3.

Optical transmission signal EST, optical transmission signal OST, electrical reception signal ESR and optical reception signal OSR may be multi-bit signals. Each of transmission light LTT and reception light LTR may be divided into multiple beams corresponding to the bit number of the transferred signal. As described above, electrical-to-optical conversion unit 53 comprises one or more optical modulators such that each optical modulator may generate each bit of optical transmission signal OST based on transmission light LTT and each bit of electrical transmission signal EST. C-O/E 73 comprises one or more coherent receivers such that each coherent receiver may generate each bit of electrical reception signal ESR based on reception light LTR and each bit of optical reception signal OSR.

Compared with optical interface module 10 of FIG. 1, which is coupled to unidirectional channels OTLT and OTLR, optical interface module 13 of FIG. 5 is coupled to a bidirectional channel OTL. For such configuration, optical interface module 13 further comprises a transmission-reception path combiner 90. Transmission-reception path combiner 90 is coupled to bidirectional channel OTL to transfer optical transmission signal OST from electrical-to-optical conversion unit 53 to bidirectional channel OTL and to transfer optical reception signal OSR from bidirectional channel OTL to C-O/E 73.

As such, optical interface module 13 does not require a conventional local oscillating light source for the coherent reception, but optical interface module 13 may perform the coherent reception of high sensitivity by dividing the light for the optical modulation. Thus the number of light sources may be reduced and relatively efficient optical communication of low power and high reliability may be performed without increasing system size and design burden.

Figure 6:
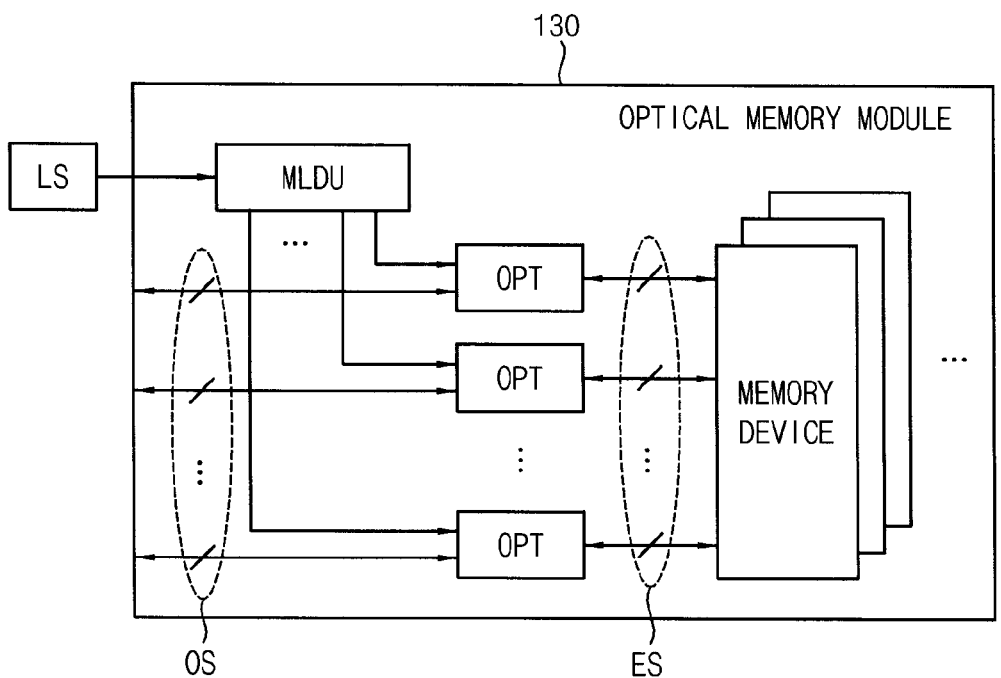
FIG. 6 is a block diagram illustrating an optical memory module according to an embodiment of the inventive concept.

FIG. 6 is a block diagram illustrating an optical memory module 130 according to an embodiment of the inventive concept.

Referring to FIG. 6, optical memory module 130 comprises one or more memory devices configured to store data and one or more optical interface modules OPTs configured to perform optical communication between the memory devices and an external device. Optical interface modules OPTs perform signal conversion between electrical signals ES and optical signals OS. As described above, each of optical interface modules OPTs comprises an input-output light distribution unit configured to divide a received light to provide a transmission light and a reception light, an electrical-to-optical conversion unit configured to perform an optical modulation based on the transmission light and an electrical transmission signal to generate an optical transmission signal, and a coherent optical-to-electrical conversion unit configured to perform a coherent reception based on the reception light and an optical reception signal to generate an electrical reception signal.

In some embodiments, optical memory module 130 comprises memory modules OPTs as illustrated in FIG. 6. In this case, optical memory module 130 may further comprise a module light distribution unit MLDU to divide a light into multiple divided lights to provide the divided lights for optical interface modules OPTs, respectively. Module light distribution unit MLDU may have a configuration similar to a global light distribution as described with reference to FIGS. 7 through 13.

Figure 7:
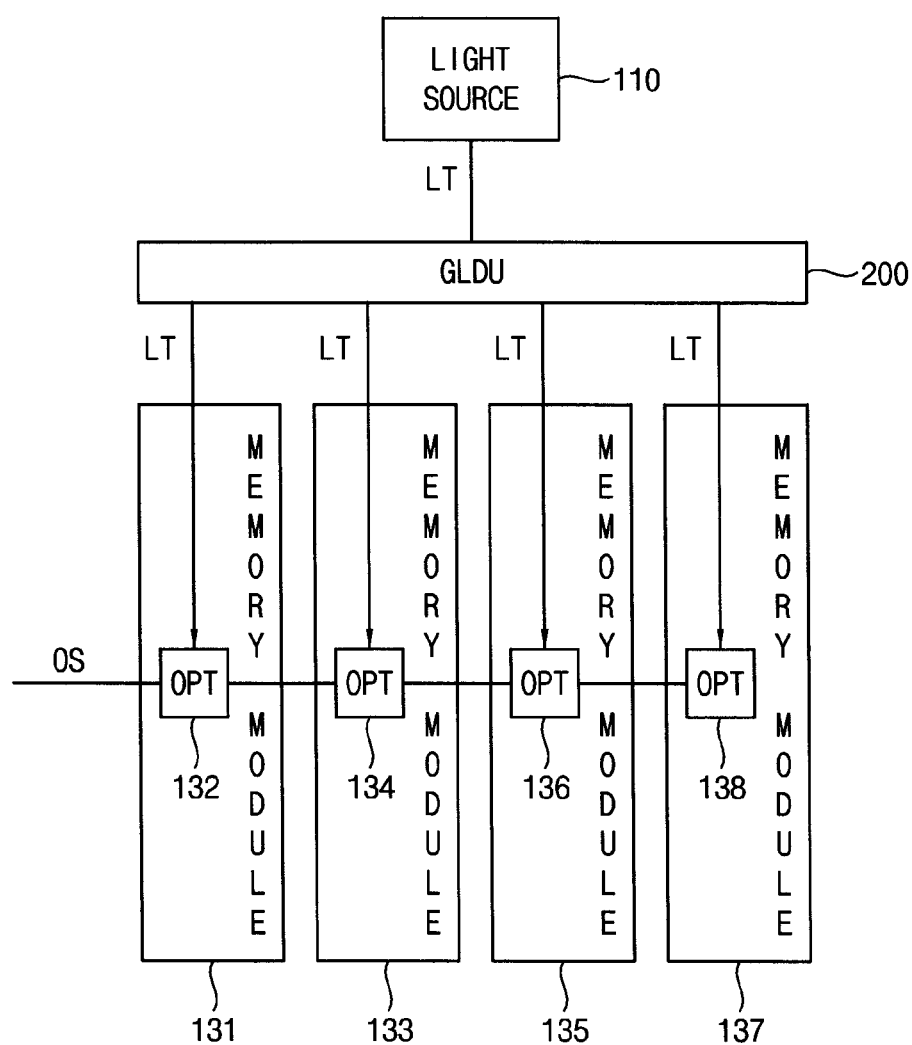
FIG. 7 is a block diagram illustrating an optical memory system comprising multiple memory modules sharing a light source according to an embodiment of the inventive concept.
Figure 26:
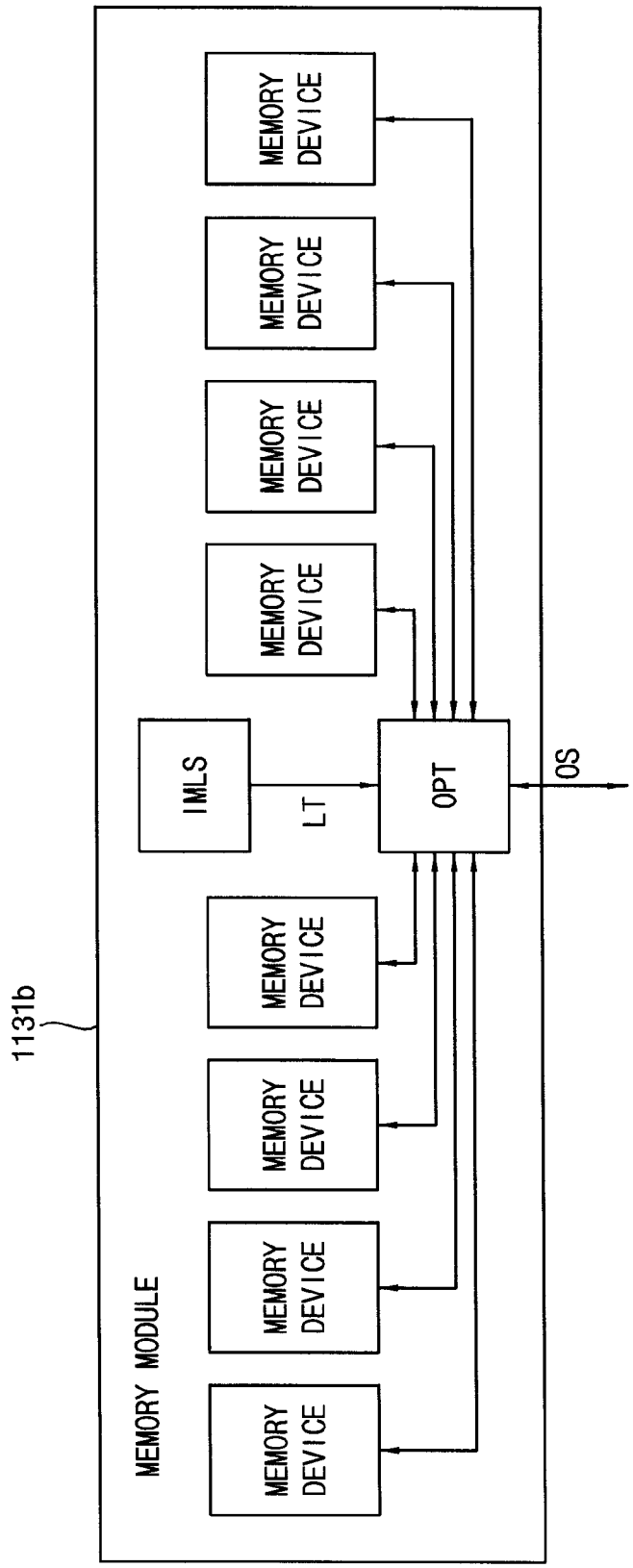
FIG. 26 is a diagram illustrating an example of a memory module in the optical memory system of FIG. 25.

A light source LS shown in FIG. 6 may be disposed inside or outside the optical memory module. In some embodiments, module light distribution unit MLDU receives the light from a light source LS disposed outside optical memory module 130, as illustrated in FIG. 6. In other embodiments, module light distribution unit MLDU receives the light from a global light distribution unit disposed outside the optical memory module, as illustrated in FIG. 7. In still other embodiments, module light distribution unit MLDU further comprises an in-module light source configured to generate a light to provide the generated light to module light distribution unit MLDU, as illustrated in FIG. 26.

FIG. 7 is a block diagram illustrating an optical memory system 100 comprising multiple memory modules sharing a light source according to an embodiment of the inventive concept.

Referring to FIG. 7, optical memory system 100 comprises a light source 110, multiple memory modules 131, 133, 135 and 137 and a global light distribution unit (GLDU) 200. Although not shown in FIG. 7 for convenience of illustration, optical memory system 100 may further comprise a memory controller.

Light source 110 generates light LT that is used to transfer an optical signal OS by memory modules 131, 133, 135 and 137. For example, light source 110 may include a laser diode (LD), a light emitting diode (LED), an amplified spontaneous emission of an optical amplifier, etc.

Memory modules 131, 133, 135 and 137 may transmit optical signal OS to the memory controller, or it may receive an optical signal from the memory controller. Accordingly, each memory module 131, 133, 135 and 137 may be referred to as an optically connected memory module, for example, an optically connected dual inline memory module (OCDIMM).

Each memory module 131, 133, 135 and 137 comprises multiple memory devices arranged, for example, on a board or substrate (e.g., printed circuit board [PCB]). For example, the memory devices may be implemented as a dynamic random access memory (DRAM), a static random access memory (SRAM), a phase random access memory (PRAM), a ferroelectric random access memory (FRAM), a resistive random access memory (RRAM), a magnetic random access memory (MRAM), etc. In some embodiments, each memory module 131, 133, 135 and 137 may be a dual inline memory module (DIMM), a single inline memory module (SIMM), or the like.

Each memory module 131, 133, 135 and 137 comprises at least one optical interface module OPT. As described above, each of optical interface modules OPTs comprises an input-output light distribution unit configured to divide a received light to provide a transmission light and a reception light, an electrical-to-optical conversion unit configured to perform an optical modulation based on the transmission light and an electrical transmission signal to generate an optical transmission signal, and a coherent optical-to-electrical conversion unit configured to perform a coherent reception based on the reception light and an optical reception signal to generate an electrical reception signal.

Optical interface module OPT outputs optical signal OS to the memory controller by converting an electrical signal output from the memory devices in each memory module into optical signal OS using light LT generated by light source 110. Optical interface module OPT may also perform coherent reception with respect to the optical signal from the memory controller by using light LT generated by light source 110.

Light LT from light source 110 is divided into multiple first divided lights by global light distribution unit 200 as illustrated in FIG. 7, and each of the first divided lights is then divided into transmission light LTT and reception light LTR by input-output light distribution unit 30 in each of memory modules 131, 133, 135 and 137, as illustrated in FIG. 1.

In some embodiments, the electrical signal output from the memory devices may be a data signal output from the memory devices, for example, including data to be read from the memory devices. Memory modules 131, 133, 135 and 137 convert the data signal into optical signal OS (e.g., an optical data signal), and they output optical signal OS to the memory controller. As such, data stored in memory modules 131, 133, 135 and 137 is provided to the memory controller in the form of optical signal OS.

The memory controller transmits a data signal, a command signal and an address signal to memory modules 131, 133, 135 and 137 to control operations of memory modules 131, 133, 135 and 137. In some embodiments, the memory controller converts at least one of the data signal, the command signal and the address signal into an optical signal, and it transmits the optical signal to memory modules 131, 133, 135 and 137. That is, write data, a command, and an address provided from the memory controller to memory modules 131, 133, 135 and 137 may be transferred in a form of the optical signal. For example, the memory controller may transmit the data signal in a form of the optical signal to memory modules 131, 133, 135 and 137 through an optical transmission line, and it may transmit the command signal and the address signal in a form of an electrical signal to memory modules 131, 133, 135 and 137. In other examples, the memory controller may transmit all of the data signal, the command signal, and the address signal in a form of the optical signal to memory modules 131, 133, 135 and 137 through the optical transmission line.

Global light distribution unit 200 is coupled between light source 110 and memory modules 131, 133, 135 and 137, and it distributes light LT generated by light source 110 to memory modules 131, 133, 135 and 137.

In some embodiments, global light distribution unit 200 comprises at least one optical splitter as a passive element. Global light distribution unit 200 splits light LT generated by light source 110 into multiple lights, and may provide the lights to memory modules 131, 133, 135 and 137, respectively.

In certain other embodiments, global light distribution unit 200 comprises at least one optical switch as an active element. The optical switch may selectively provide light LT generated by light source 110 to an active one of memory modules 131, 133, 135 and 137 in response to a control signal provided from the memory controller. For example, the optical switch may couple light source 110 only to a memory module currently performing a read operation among memory modules 131, 133, 135 and 137, so that light LT generated by light source 110 may be provided only to the memory module currently performing the read operation.

In still other embodiments, light source 110 may adjust a wavelength of light LT in response to a control signal provided from the memory controller, and global light distribution unit 200 comprises a wavelength division multiplexing (WDM) demultiplexer as a passive element.

The WDM demultiplexer may generate multiple lights having different wavelengths from each other by dividing light LT generated by light source 110 according to the wavelengths, and may provide the lights having the different wavelengths to memory modules 131, 133, 135 and 137, respectively. For example, the WDM demultiplexer may divide light LT generated by light source 110 according to the wavelengths to generate multiple divided lights having the different wavelengths respectively corresponding to memory modules 131, 133, 135 and 137, and may provide the divided lights to memory modules 131, 133, 135 and 137, respectively. Light source 110 may adjust the wavelength of light LT to a wavelength corresponding to an active memory module performing the read operation in response to the control signal. Thus, light LT generated by light source 110 may be provided only to the active memory module performing the read operation.

In some embodiments, a silicon photonics technique may be employed, and the light source may be implemented as a III-V group semiconductor laser, a hybrid silicon laser, an all-silicon laser, etc. The electrical-to-optical converters and the coherent optical-to-electrical converters in optical interface modules 132, 134, 136 and 138 may be implemented using a typical semiconductor manufacturing process, and the elements such as light source 110, global light distribution unit 200 and optical interface modules 132, 134, 136 and 138 may be coupled to each other through a silicon waveguide. However, embodiments are not limited to the silicon photonics technique, and may employ various photonics techniques.

In optical memory system 100, light LT generated by light source 100 may be distributed to memory modules 131, 133, 135 and 137 by global light distribution unit 200 and thus memory modules 131, 133, 135 and 137 may share light source 110. In addition, the distributed light may be redistributed to transmission light LTT and reception light LTR by input-output light distribution unit 30 as illustrated in FIG. 1. As such, the optical interface module and the optical memory system does not require a conventional local oscillating light source for the coherent reception, but may perform the coherent reception of high sensitivity by dividing the light for the optical modulation. Thus the number of light sources may be reduced, and relatively efficient optical communication with low power and high reliability may be achieved without increasing system size and design burden.

FIGS. 8 through 13 are diagrams illustrating variations of the optical memory system of FIG. 7.

Figure 8:
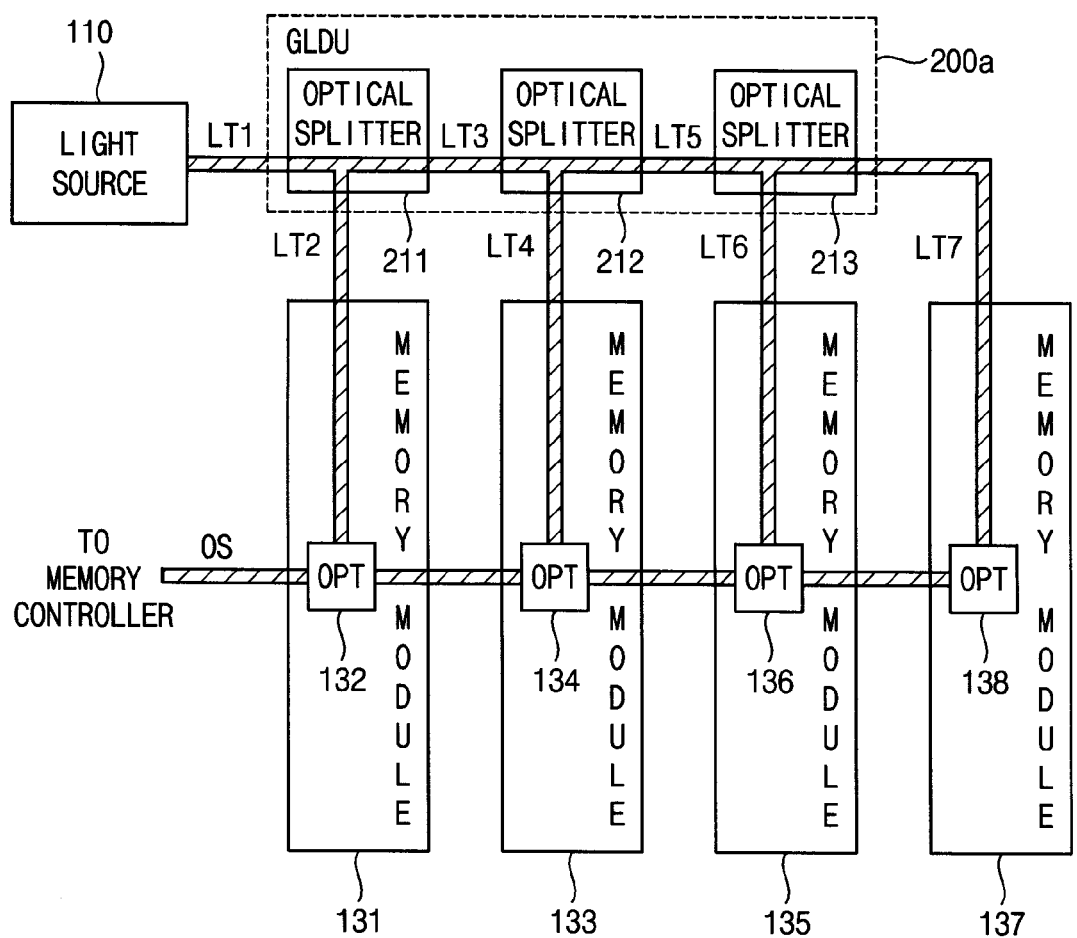
FIG. 8 is a diagram illustrating a variation of the optical memory system of FIG. 7.

Referring to FIG. 8, an optical memory system 100a comprises a light source 110, first through fourth memory modules 131, 133, 135 and 137 and a global light distribution unit 200a. First through fourth memory modules 131, 133, 135 and 137 comprise first through fourth electrical-to-optical converting units 132, 134, 136 and 138, respectively.

Global light distribution unit 200a distributes light LT1 generated by light source 110 to first through fourth electrical-to-optical converting units 132, 134, 136 and 138 in first through fourth optical interface modules 131, 133, 135 and 137. Global light distribution unit 200a comprises at least one 1:n (e.g., 1:2) optical splitter 211, 212 and 213 for splitting light LT1 generated by light source 110.

Global light distribution unit 200a comprises a first optical splitter 211, a second optical splitter 212 and a third optical splitter 213. First optical splitter 211 splits light LT1 generated by light source 110 into first split light LT2 and second split light LT3. First split light LT2 is provided to first optical interface module 132 in first memory module 131, and second split light LT3 is provided to second optical splitter 212. Second optical splitter 212 splits second split light LT3 into third split light LT4 and fourth split light LT5. Third split light LT4 is provided to second optical interface module 134 in second memory module 133, and fourth split light LT5 is provided to third optical splitter 213. Third optical splitter 213 splits fourth split light LT5 into fifth split light LT6 and sixth split light LT7. Fifth split light LT6 is provided to third optical interface module 136 in third memory module 135, and sixth split light LT7 is provided to fourth optical interface module 138 in fourth memory module 137.

Accordingly, first through optical interface modules 132, 134, 136 and 138 in first through fourth memory modules 131, 133, 135 and 137 receive split lights LT2, LT4, LT6 and LT7 that are split from light LT1 generated by light source 110, respectively, and they convert an electrical signal output from multiple memory devices into an optical signal and perform coherent reception of the optical signal from the memory controller by using split lights LT2, LT4, LT6 and LT7.

As described above, in optical memory system 100a, light LT1 generated by light source 110 is distributed to memory modules 131, 133, 135 and 137 by the 1:2 optical splitters 211, 212 and 213, and thus memory modules 131, 133, 135 and 137 share light source 110. Accordingly, optical memory system 100a has a reduced number (e.g., 1) of light sources.

Figure 9:
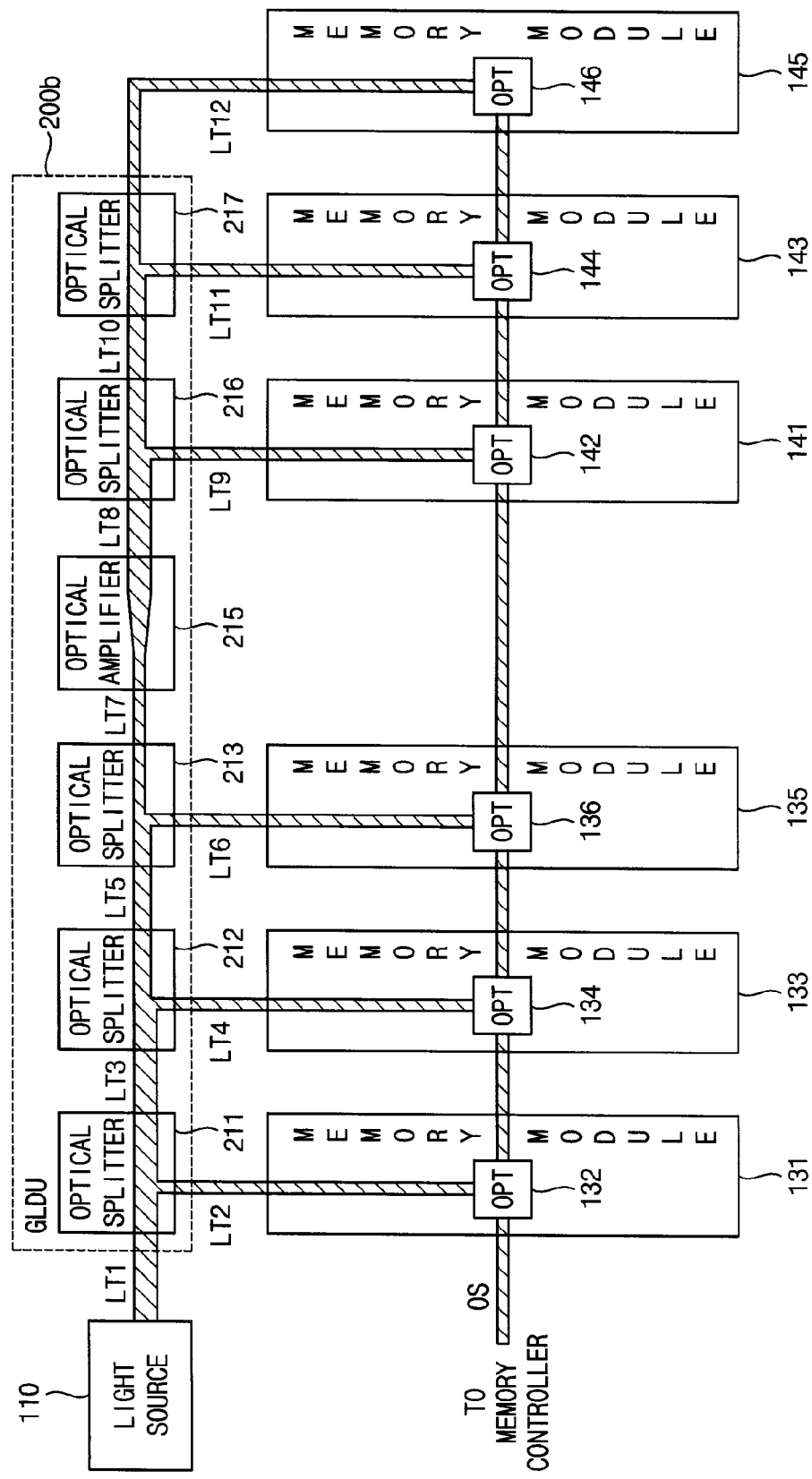
FIG. 9 is a diagram illustrating another variation of the optical memory system of FIG. 7.

Referring to FIG. 9, an optical memory system 100b comprises a light source 110, first through sixth memory modules 131, 133, 135, 141, 143 and 145 and a global light distribution unit 200b. First through sixth memory modules 131, 133, 135, 141, 143 and 145 comprise first through sixth optical interface modules 132, 134, 136, 142, 144 and 146, respectively.

Global light distribution unit 200b distributes light LT1 generated by light source 110 to first through sixth optical interface modules 132, 134, 136, 142, 144 and 146 in first through sixth memory modules 131, 133, 135, 141, 143 and 145. Global light distribution unit 200b comprises at least one 1:2 optical splitter 211, 212, 213, 216, 217 for splitting light LT1 generated by light source 110 and at least one optical amplifier 215 for amplifying the split light such that the split light has an optical power higher than a threshold optical power that is required to perform an electrical-to-optical conversion by each electrical-to-optical converting unit 132, 134, 136, 142, 144 and 146.

Global light distribution unit 200b comprises first through fifth optical splitters 211, 212, 213, 216 and 217 and an optical amplifier 215. First optical splitter 211 splits light LT1 generated by light source 110 into first split light LT2 and second split light LT3, and it provides first split light LT2 to first optical interface module 132 in first memory module 131. Second optical splitter 212 splits second split light LT3 into third split light LT4 and fourth split light LT5, and it provides third split light LT4 to second optical interface module 134 in second memory module 133. Third optical splitter 213 splits fourth split light LT5 into fifth split light LT6 and sixth split light LT7, and it provides fifth split light LT6 to third optical interface module 136 in third memory module 135.

Because sixth split light LT7 is split from light LT1 generated by light source 110 by the first through third optical splitters 211, 212 and 213, sixth split light LT7 may have lower optical power than light LT1 generated by light source 110. Further, sixth split light LT7 may have lower optical power than the threshold optical power that is required to perform the electrical-to-optical conversion by each optical interface module 132, 134, 136, 142, 144 and 146. In this case, to have an optical power higher than the threshold optical power, sixth split light LT7 may be amplified by optical amplifier 215. Optical amplifier 215 generates amplified light LT8 by amplifying sixth split light LT7.

Fourth optical splitter 216 splits amplified light LT8 into seventh split light LT9 and eighth split light LT10, and it provides seventh split light LT9 to fourth optical interface module 142 in fourth memory module 141. Fifth optical splitter 217 splits eighth split light LT10 into ninth split light LT11 and tenth split light LT12. It also provides ninth split light LT11 to optical interface module 144 in fifth memory module 143, and it provides tenth split light LT12 to optical interface module 146 in sixth memory module 145.

As described above, in optical memory system 100b, memory modules 131, 133, 135, 141, 143 and 145 share light source 110, and thus optical memory system 100b has the reduced number of light sources. Further, because global light distribution unit 200b comprises at least one optical amplifier 215, a light having an optical power higher than the threshold optical power may be provided to each memory module 131, 133, 135, 141, 143 and 145 although the number of memory modules 131, 133, 135, 141, 143 and 145 in optical memory system 100b increases. Accordingly, optical memory system 100b may readily increase the number of memory modules, and may readily increase a system memory capacity.

Figure 10:
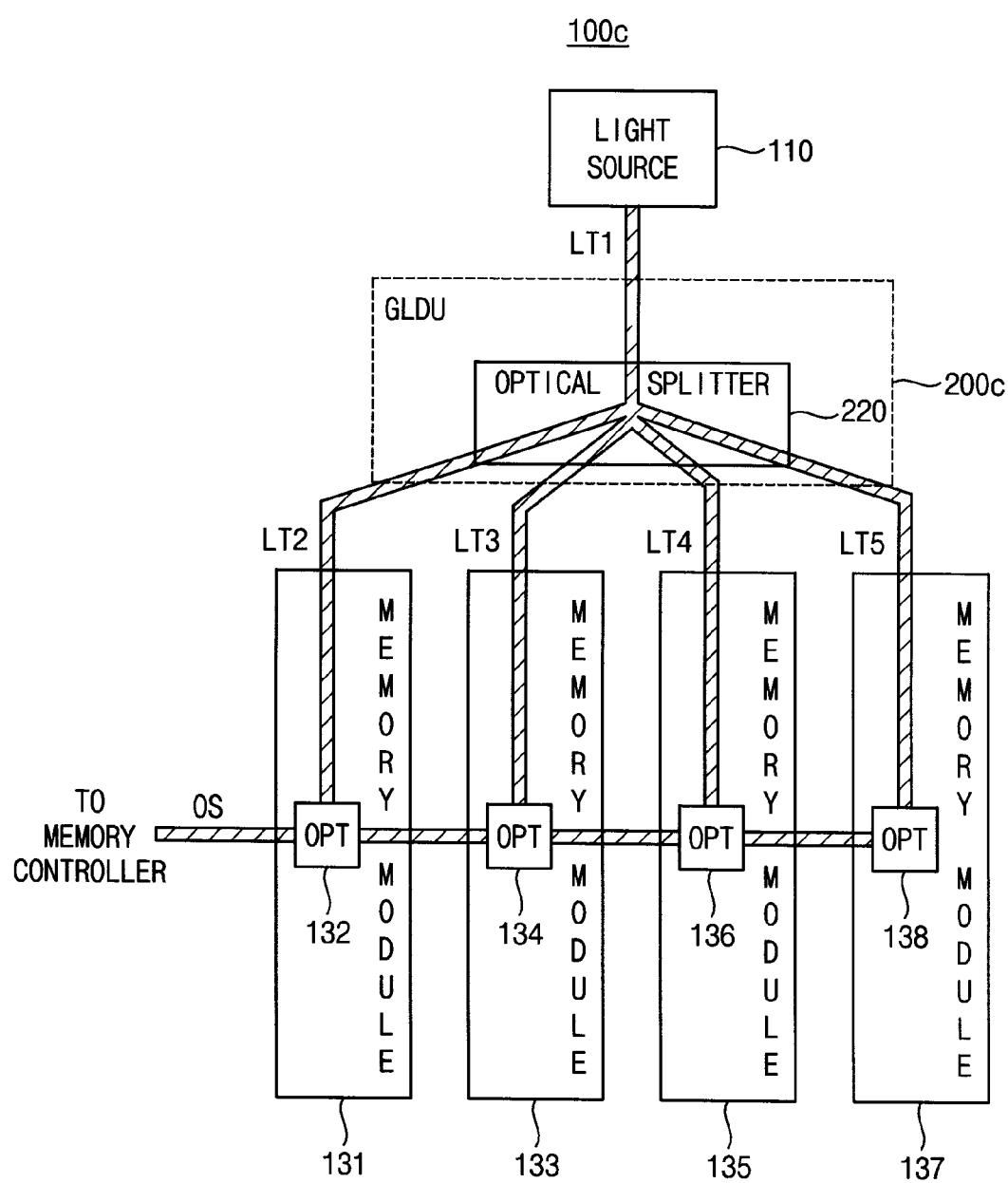
FIG. 10 is a diagram illustrating another variation of the optical memory system of FIG. 7.

Referring to FIG. 10, an optical memory system 100c comprises a light source 110, first through fourth memory modules 131, 133, 135 and 137 and a global light distribution unit 200c. First through fourth memory modules 131, 133, 135 and 137 comprise first through fourth electrical-to-optical converting units 132, 134, 136 and 138, respectively.

Global light distribution unit 200c distributes light LT1 generated by light source 110 to first through fourth optical interface modules 132, 134, 136 and 138 in first through fourth memory modules 131, 133, 135 and 137. Global light distribution unit 200c comprises one 1:N optical splitter 220 for splitting light LT1 generated by light source 110.

Optical splitter 220 splits light LT1 generated by light source 110 into first split light LT2, second split light LT3, third split light LT4 and fourth split light LT5. In one embodiment, each of first split light LT2, second split light LT3, third split light LT4, and fourth split light LT5 has substantially 25% of the optical power of light LT1 (e.g., 25% of the optical power, minus small optical power losses inherent in the splitting process). However, other percentages may apply. First split light LT2 is provided to first optical interface module 132 in first memory module 131, second split light LT3 is provided to second optical interface module 134 in second memory module 133, third split light LT4 is provided to third optical interface module 136 in third memory module 135, and fourth split light LT5 is provided to fourth optical interface module 138 in fourth memory module 137.

Accordingly, first through fourth optical interface modules 132, 134, 136 and 138 in first through fourth memory modules 131, 133, 135 and 137 receive split lights LT2, LT3, LT4 and LT5 that are split from light LT1 generated by light source 110, respectively, and they convert an electrical signal output from multiple memory devices into an optical signal and perform coherent reception of the optical signal from the memory controller using split lights LT2, LT3, LT4 and LT5.

As described above, in optical memory system 100c, light LT1 generated by light source 110 is distributed to memory modules 131, 133, 135 and 137 by the one 1:N optical splitter 220, and thus memory modules 131, 133, 135 and 137 may share light source 110. Accordingly, optical memory system 100c according to an embodiment of the inventive concept may have the reduced number of light sources.

Figure 11:
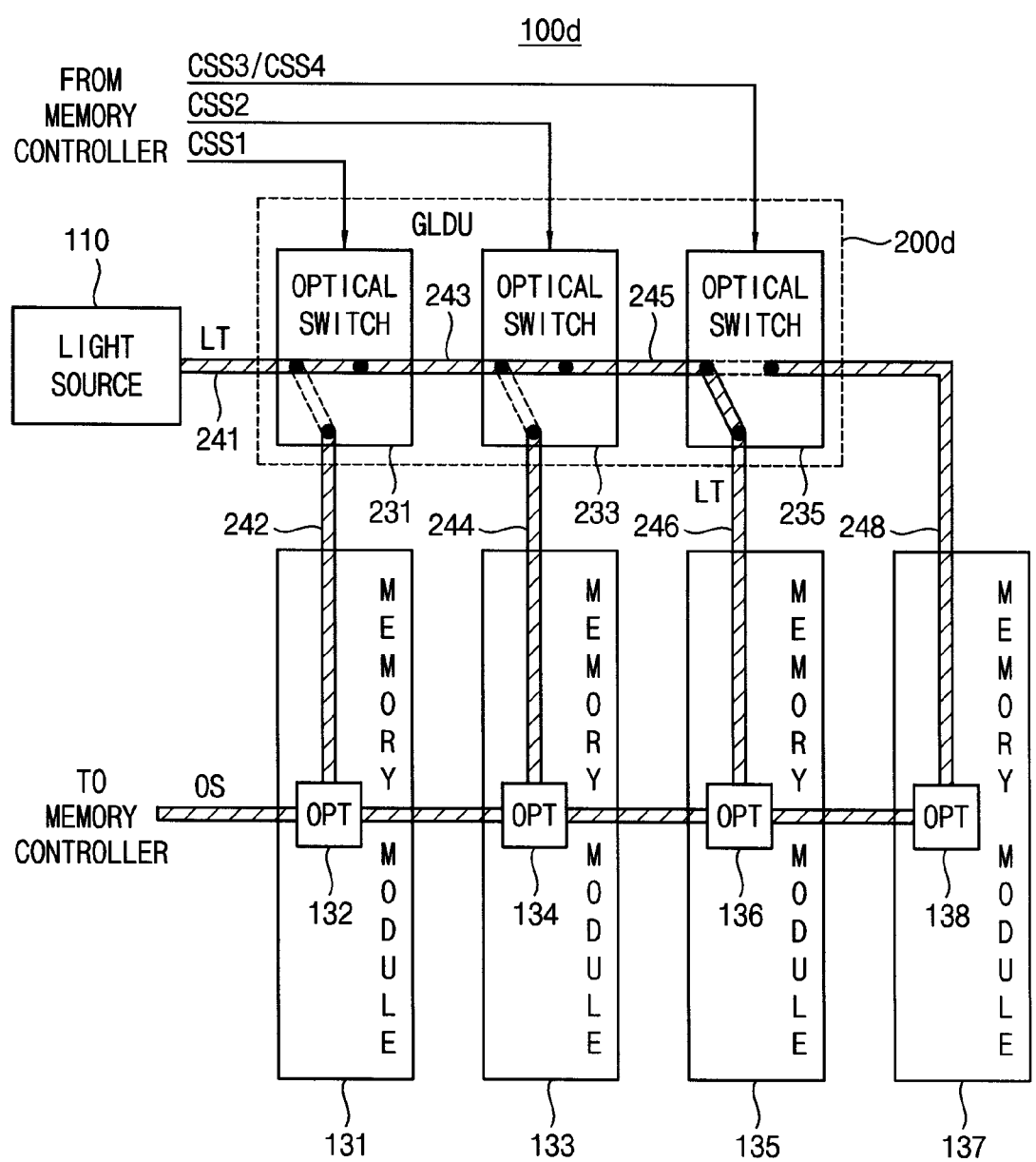
FIG. 11 is a diagram illustrating another variation of the optical memory system of FIG. 7.

Referring to FIG. 11, an optical memory system 100d comprises a light source 110, first through fourth memory modules 131, 133, 135 and 137 and a global light distribution unit 200d. First through fourth memory modules 131, 133, 135 and 137 comprises first through fourth optical interface modules 132, 134, 136 and 138, respectively.

Global light distribution unit 200d may distribute a light LT generated by light source 110 to first through fourth optical interface modules 132, 134, 136 and 138 in first through fourth memory modules 131, 133, 135 and 137. Global light distribution unit 200d may be an active light distribution unit that comprises at least one 1:2 optical switch 231, 233 and 235 for selectively providing light LT generated by light source 110 to an optical interface module in an active one of the first through fourth memory modules 131, 133, 135 and 137 in response to a control signal provided from a memory controller.

Global light distribution unit 200d comprises a first optical switch 231, a second optical switch 233 and a third optical switch 235. First optical switch 231 selectively couples a first optical transmission line 241 between light source 110 and first optical switch 231 to a second optical transmission line 242 between first optical switch 231 and first optical interface module 132 or to a third optical transmission line 243 between first optical switch 231 and second optical switch 233 in response to the control signal. Second optical switch 233 selectively couples third optical transmission line 243 to a fourth optical transmission line 244 between second optical switch 233 and second optical interface module 134, or to a fifth optical transmission line 245 between second optical switch 233 and third optical switch 235 in response to the control signal. Third optical switch 235 selectively couples fifth optical transmission line 245 to a sixth optical transmission line 246 between third optical switch 235 and third optical interface module 136, or to a seventh optical transmission line 247 between third optical switch 235 and fourth optical interface module 138 in response to the control signal.

In some embodiments, global light distribution unit 200d receives, as a control signal from the memory controller, chip select signals CSS1, CSS2, CSS3 and CSS4, of which each indicates whether a corresponding memory module or a corresponding rank is in an active state. For example, first optical switch 231 may receive as the control signal from the memory controller a first chip select signal CSS1 that indicates whether first memory module 131 or a rank in first memory module 131 is in an active state, second optical switch 233 may receive as the control signal from the memory controller a second chip select signal CSS2 that indicates whether second memory module 133 or a rank in second memory module 133 is in an active state, and third optical switch 235 may receive as the control signal from the memory controller a third chip select signal CSS3 that indicates whether third memory module 135 or a rank in third memory module 135 is in an active state, and/or a fourth chip select signal CSS4 that indicates whether fourth memory module 137 or a rank in fourth memory module 137 is in an active state.

Global light distribution unit 200d provides light LT generated by light source 110 to an active memory module or a memory module comprising an active rank among the first through fourth memory modules 131, 133, 135 and 137 in response to first chip select signal CSS1, second chip select signal CSS2, third chip select signal CSS3 and/or fourth chip select signal CSS4. Optical switches are generally known, so details of the optical switches discussed herein are omitted for the sake of brevity, but can include any known optical switching elements.

If first chip select signal CSS1 has a first logic level indicating that first memory module 131 is in an active state (or that first memory module 131 performs a read operation), and second and third chip select signals CSS2 and CSS3 have a second logic level, first optical switch 231 may couple first optical transmission line 241 to second optical transmission line 242 in response to first chip select signal CSS1 having the first logic level. Accordingly, light LT generated by light source 110 may be provided to first optical interface module 132 in first memory module 131 that is in an active state (or that performs the read operation) through first optical transmission line 241 and optical transmission line 242.

If second chip select signal CSS2 has the first logic level indicating that second memory module 133 is in an active state, and the first and third chip select signals CSS1 and CSS3 have the second logic level, first optical switch 231 couples first optical transmission line 241 to third optical transmission line 243 in response to first chip select signal CSS1 having the second logic level, and second optical switch 233 couples third optical transmission line 243 to fourth optical transmission line 244 in response to second chip select signal CSS2 having the first logic level. Accordingly, light LT generated by light source 110 is provided to second optical interface module 134 in second memory module 133 that is in an active state through first optical transmission line 241, third optical transmission line 243 and fourth optical transmission line 244.

If third chip select signal CSS3 has the first logic level indicating that third memory module 135 is in an active state, and first and second chip select signals CSS1 and CSS2 have the second logic level, first optical switch 231 couples first optical transmission line 241 to third optical transmission line 243 in response to first chip select signal CSS1 having the second logic level, second optical switch 233 couples third optical transmission line 243 to fifth optical transmission line 245 in response to second chip select signal CSS2 having the second logic level, and third optical switch 235 couples fifth optical transmission line 245 to sixth optical transmission line 246 in response to third chip select signal CSS3 having the first logic level. Accordingly, light LT generated by light source 110 is provided to third optical interface module 136 in third memory module 135 that is in an active state through first optical transmission line 241, third optical transmission line 243, fifth optical transmission line 245 and sixth optical transmission line 246.

If fourth memory module 137 is in an active state, first through third chip select signals CSS1, CSS2 and CSS3 have the second logic level. First optical switch 231 is coupled first optical transmission line 241 to third optical transmission line 243 in response to first chip select signal CSS1 having the second logic level, second optical switch 233 couples third optical transmission line 243 to fifth optical transmission line 245 in response to second chip select signal CSS2 having the second logic level, and third optical switch 235 couples fifth optical transmission line 245 to seventh optical transmission line 247 in response to third chip select signal CSS3 having the second logic level. Accordingly, light LT generated by light source 110 is provided to fourth optical interface module 138 in fourth memory module 137 that is in an active state through first optical transmission line 241, third optical transmission line 243, fifth optical transmission line 245 and seventh optical transmission line 247.

As described above, in optical memory system 100d, light LT generated by light source 110 is distributed to memory modules 131, 133, 135 and 137 by the 1:2 optical switches 231, 233 and 235, and thus memory modules 131, 133, 135 and 137 share light source 110. Accordingly, optical memory system 100d may have the reduced number of light sources. Further, the 1:2 optical switches 231, 233 and 235 may couple light source 110 to a memory module that is in an active state or that performs the read operation among multiple memory modules 131, 133, 135 and 137, and thus light LT generated by light source 110 may be provided only to the active memory module. Accordingly, compared to a conventional optical memory system where a light is provided to an inactive memory module (e.g., a memory module that is in a ready state or an idle state) as well as an active memory module, optical memory system 100d provides light LT only to the active memory module, thereby reducing power consumption. Further, although the number of memory modules 131, 133, 135 and 137 increases, the number of light sources the power consumption may avoid an increase. Accordingly, optical memory system 100d may readily increase the number of memory modules 131, 133, 135 and 137 and system memory capacity.

Figure 12:
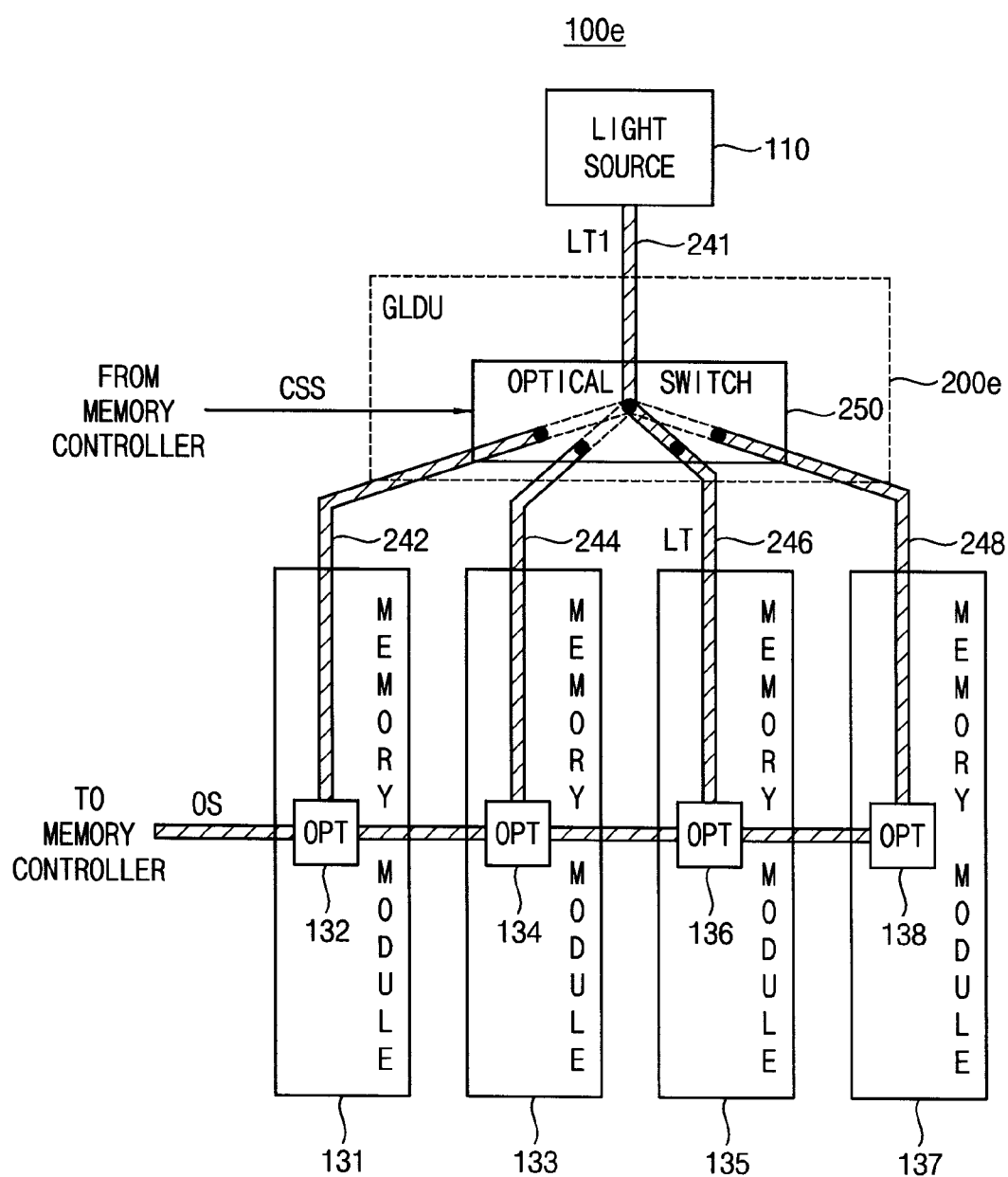
FIG. 12 is a diagram illustrating another variation of the optical memory system of FIG. 7.

Referring to FIG. 12, an optical memory system 100e comprises a light source 110, first through fourth memory modules 131, 133, 135 and 137 and a global light distribution unit 200e. First through fourth memory modules 131, 133, 135 and 137 comprise first through fourth optical interface modules 132, 134, 136 and 138, respectively.

Global light distribution unit 200e distributes light LT generated by light source 110 to first through fourth optical interface modules 132, 134, 136 and 138 in first through fourth memory modules 131, 133, 135 and 137. Global light distribution unit 200e comprises one 1:N optical switch 250 for selectively providing light LT generated by light source 110 to an electrical-to-optical converting unit in an active one of the first through fourth memory modules 131, 133, 135 and 137 in response to a control signal provided from a memory controller.

Optical switch 250 selectively couples a first optical transmission line 241 between light source 110 and optical switch 250 to a second optical transmission line 242 between optical switch 250 and first optical interface module 132, to a third optical transmission line 244 between optical switch 250 and the second optical interface module, to a fourth optical transmission line 246 between optical switch 250 and third optical interface module 136 or to a fifth optical transmission line 248 between optical switch 250 and fourth optical interface module 138.

In some embodiments, optical switch 250 receives a memory select signal, such as a chip select signal CSS as the control signal from the memory controller. Optical switch 250 receives a first chip select signal that indicates whether first memory module 131 is in an active state, a second chip select signal that indicates whether second memory module 133 or a rank is in an active state, a third chip select signal that indicates whether third memory module 135 is in an active state, and a fourth chip select signal that indicates whether fourth memory module 137 is in an active state from the memory controller. Optical switch 250 provides light LT generated by light source 110 to an active memory module among the first through fourth memory modules 131, 133, 135 and 137 in response to the first through fourth chip select signals.

Where first chip select signal CSS1 has a first logic level, optical switch 250 may couple first optical transmission line 241 to second optical transmission line 242 to provide light LT to first optical interface module 132 in first memory module 131 that is in an active state (or that performs a read operation). Where second chip select signal CSS2 has the first logic level, optical switch 250 may couple first optical transmission line 241 to third optical transmission line 244 to provide light LT to second optical interface module 134 in second memory module 133 that is in an active state. Where third chip select signal CSS3 has the first logic level, optical switch 250 may couple first optical transmission line 241 to fourth optical transmission line 246 to provide light LT to third optical interface module 136 in third memory module 135 that is in an active state. Where fourth chip select signal CSS4 has the first logic level, optical switch 250 may couple first optical transmission line 241 to fifth optical transmission line 248 to provide light LT to fourth optical interface module 138 in fourth memory module 137 that is in an active state.

As described above, in optical memory system 100e, light LT generated by light source 110 is distributed to memory modules 131, 133, 135 and 137 by one 1:N optical switch 250, and thus memory modules 131, 133, 135 and 137 may share light source 110. Accordingly, optical memory system 100e may have a reduced number of light sources. Further, optical switch 250 couples light source 110 to a memory module that is in an active state or that performs the read operation among multiple memory modules 131, 133, 135 and 137, so light LT generated by light source 110 may be provided only to the active memory module. Accordingly, optical memory system 100e may operate with relatively low power consumption. Further, although the number of memory modules 131, 133, 135 and 137 increases, the number of light sources and power consumption may avoid increases. Accordingly, optical memory system 100e may readily increase the number of memory modules 131, 133, 135 and 137, and may readily increase a system memory capacity.

Figure 13:
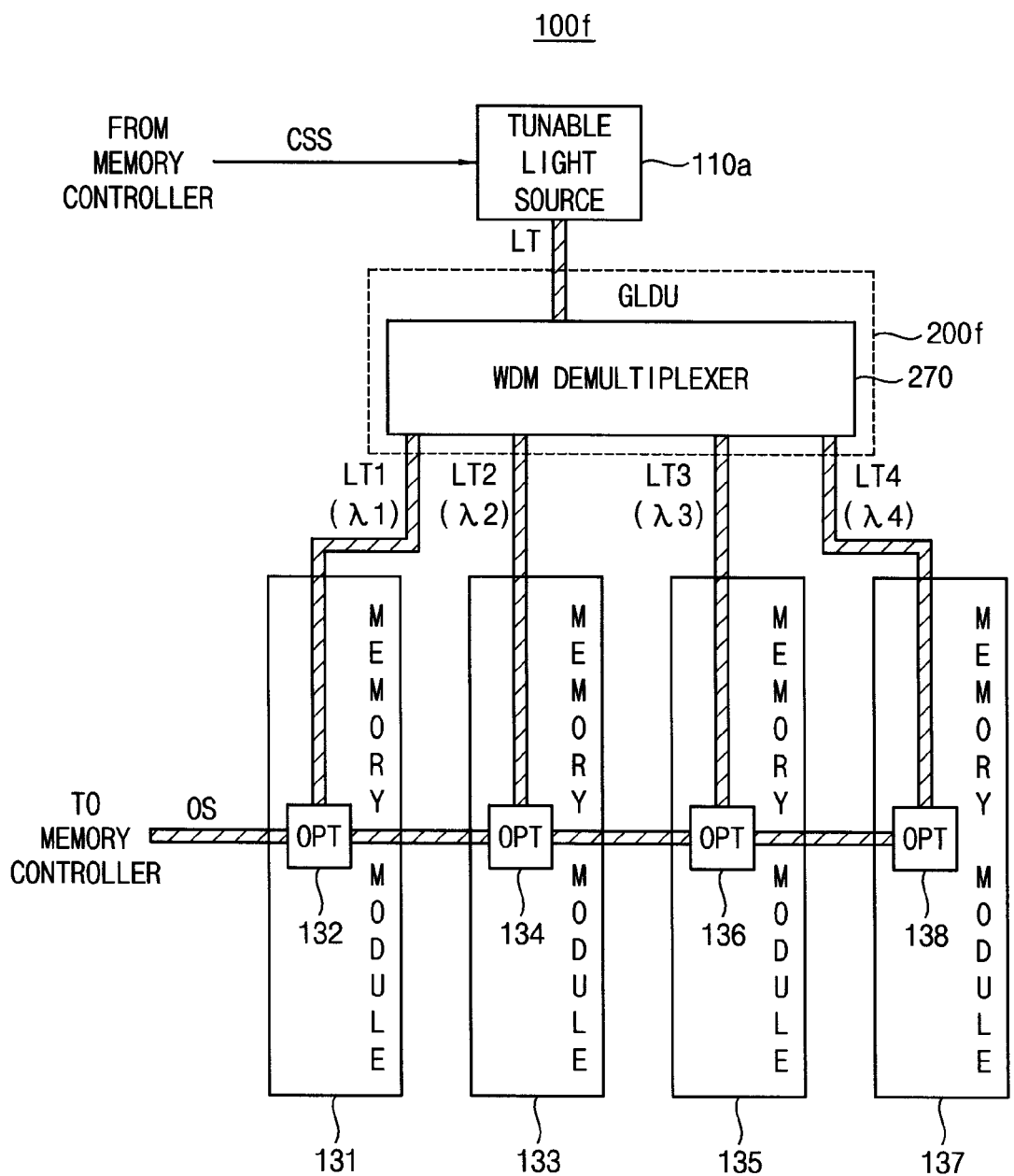
FIG. 13 is a diagram illustrating another variation of the optical memory system of FIG. 7.

Referring to FIG. 13, an optical memory system 100f comprises a light source 110a, first through fourth memory modules 131, 133, 135 and 137, and a passive global light distribution unit 200f. First through fourth memory modules 131, 133, 135 and 137 comprise first through fourth optical interface modules 132, 134, 136 and 138, respectively.

Light source 110a may generate light LT. Light source 110a may be a tunable light source that is able to adjust a wavelength of light LT in response to a control signal. In some embodiments, light source 110a receives a memory select signal such as a chip select signal CSS indicating an active memory module among the first through fourth memory modules 131, 133, 135 and 137 as the control signal from a memory controller, and it adjusts the wavelength of light LT in response to chip select signal CSS. For example, light source 110a may adjust the wavelength of light LT to a first wavelength λ1 if chip select signal CSS indicates that first memory module 131 is in an active state, may adjust the wavelength of light LT to a second wavelength λ2 if chip select signal CSS indicates that second memory module 133 is in an active state, may adjust the wavelength of light LT to a third wavelength 23 if chip select signal CSS indicates that third memory module 135 is in an active state, and may adjust the wavelength of light LT to a fourth wavelength λ4 if chip select signal CSS indicates that fourth memory module 137 is in an active state.

Global light distribution unit 200f may distribute light LT generated by light source 110 to the first through fourth optical interface modules 132, 134, 136 and 138 in first through fourth memory modules 131, 133, 135 and 137. Global light distribution unit 200f comprises a wavelength division multiplexing (WDM) demultiplexer 270. WDM demultiplexer 270 generates multiple lights LT1, LT2, LT3 and LT4 having different wavelengths λ1, λ2, λ3 and λ4 by dividing light LT generated by light source 110 according to wavelengths, and it provides lights LT1, LT2, LT3 and LT4 to multiple memory modules 131, 133, 135 and 137, respectively.

WDM demultiplexer 270 divides light LT generated by light source 110 into first light LT1 having the first wavelength λ1, second light LT2 having second wavelength λ2, third light LT3 having third wavelength λ3, and fourth light LT4 having the fourth wavelength λ4. WDM demultiplexer 270 provides first light LT1 having first wavelength λ1 to first optical interface module 132 in first memory module 131. It also provides second light LT2 having second wavelength λ2 to second optical interface module 134 in second memory module 133, it provides third light LT3 having the third wavelength λ3 to third optical interface module 136 in third memory module 135, and it provides fourth light LT4 having the fourth wavelength λ4 to fourth optical interface module 138 in fourth memory module 137.

Because light source 110a generates light LT having a wavelength corresponding to an active memory module in response to chip select signal CSS indicating the active memory module, and WDM demultiplexer 270 divides light LT according to the wavelengths to provide each memory module 131, 133, 135 and 137 with the divided light having a wavelength corresponding to each memory module 131, 133, 135 and 137, light LT generated by light source 110a may be provided only to the active memory module. For example, if chip select signal CSS indicates that third memory module 135 is in an active state or that third memory module 135 performs a read operation, light source 110a may adjust the wavelength of light LT to the third wavelength λ3, and WDM demultiplexer 270 may provide a portion of light LT having the third wavelength λ3, or light LT to third memory module 135. Under these circumstances, light LT generated by light source 110a may have an optical power of about 0 in the first, second and fourth wavelengths λ1, λ2 and λ4, and thus the first, second and fourth lights LT1, LT2 and LT4 respectively provided to the first, second and fourth memory modules 131, 133 and 137 may have the optical power of about 0. That is, light LT may be provided only to third memory module 135, and may not be provided to the first second and fourth memory modules 131, 133 and 137 that are in an inactive state.

As described above, in optical memory system 100f, memory modules 131, 133, 135 and 137 share light source 110, so optical memory system 100f may have a reduced number of light sources. Further, in optical memory system 100f, light LT generated by light source 110a may be provided only to the active memory module, so power consumption may be reduced. Further, although the number of memory modules 131, 133, 135 and 137 increases, the number of light sources may not increase and the power consumption may not increase. Accordingly, optical memory system 100f may readily increase the number of memory modules 131, 133, 135 and 137 and system memory capacity.

Figure 14:
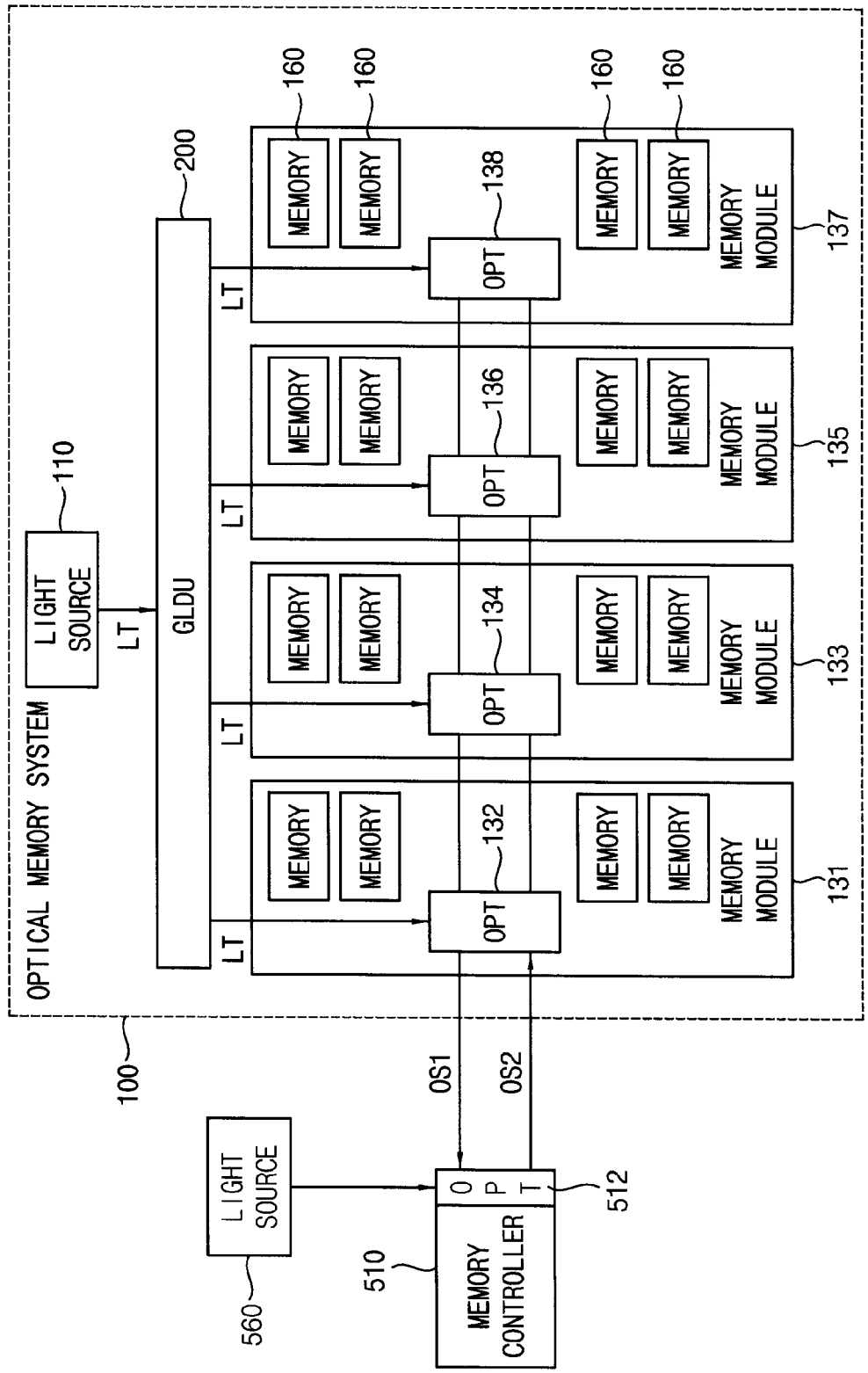
FIG. 14 is a block diagram illustrating an optical memory system according to an embodiment of the inventive concept.

FIG. 14 is a block diagram illustrating an optical memory system according to an embodiment of the inventive concept.

Referring to FIG. 14, optical memory system 100 is coupled to a memory controller 510. Optical memory system 100 comprises light source 110, memory modules 131, 133, 135 and 137, and global light distribution unit 200.

Memory controller 510 comprises an optical interface module 512 configured to receive a light from a dedicated light source 560 to perform optical communication. Memory controller 510 controls optical memory system 100. For example, memory controller 510 may transmit a data signal, a command signal and an address signal to memory modules 131, 133, 135 and 137 to control operations of memory modules 131, 133, 135 and 137. In some embodiments, memory controller 510 converts at least one of the data signal, the command signal and the address signal into an optical signal OS2, and it transmits optical signal OS2 to multiple optical interface modules 132, 134, 136 and 138 in memory modules 131, 133, 135 and 137. Further, in some embodiments, a data signal output from multiple memory devices 160 in each memory module 131, 133, 135 and 137 is converted into an optical signal OS1 by optical interface modules 132, 134, 136 and 138, and memory controller 510 receives optical signal OS1 as the data signal from optical memory system 100. In some embodiments, memory modules 131, 133, 135 and 137 are coupled to memory controller 510 in a multi-drop manner or in a daisy chain manner.

Each memory module 131, 133, 135 and 137 comprises memory devices 160 and optical interface modules 132, 134, 136 and 138. For example, memory devices 160 may be implemented as a DRAM, a SRAM, a PRAM, a FRAM, a RRAM, a MRAM, etc. Optical interface module 132, 134, 136 and 138 convert an electrical signal (e.g., the data signal) output from memory devices 160 into optical signal OS1 by using a light LT received from light source 110 via global light distribution unit 200, and may provide optical signal OS1 to memory controller 510. Memory controller 510 recovers the data signal by converting optical signal OS1 into the electrical signal.

Optical interface modules 132, 134, 136 and 138 further comprise coherent receivers configured to receive optical signal OS2 from memory controller 510 using light LT received from light source 110. The electrical signals from the coherent receivers may be provided to memory devices 160 in each memory module 131, 133, 135 and 137.

As described above, because the data signal and the command-address signal may be transferred in a form of optical signal OS1 and OS2 between memory controller 510 and optical memory system 100, an impedance mismatch may not occur, and signal integrity may not deteriorate although the number of memory modules 131, 133, 135 and 137 coupled to memory controller 510 increases. Further, in optical memory system 100, memory modules 131, 133, 135 and 137 may share light source 110 and the coherent reception may be performed without the additional local oscillating light source, thereby readily increasing the number of memory modules and readily increasing a system memory capacity.

Figure 15:
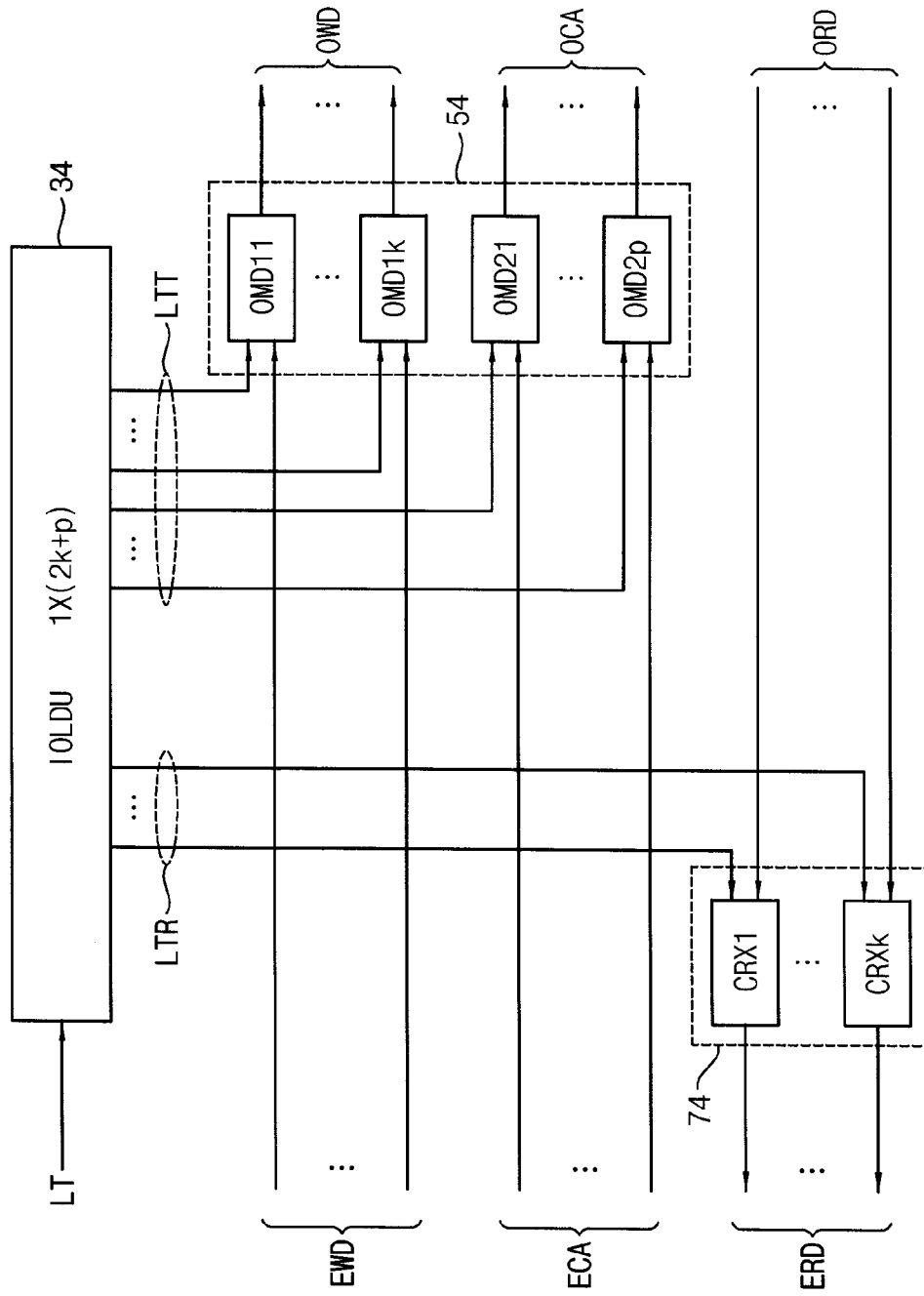
FIG. 15 is a diagram illustrating an example of an optical interface module in the memory controller in FIG. 14.
Figure 16:
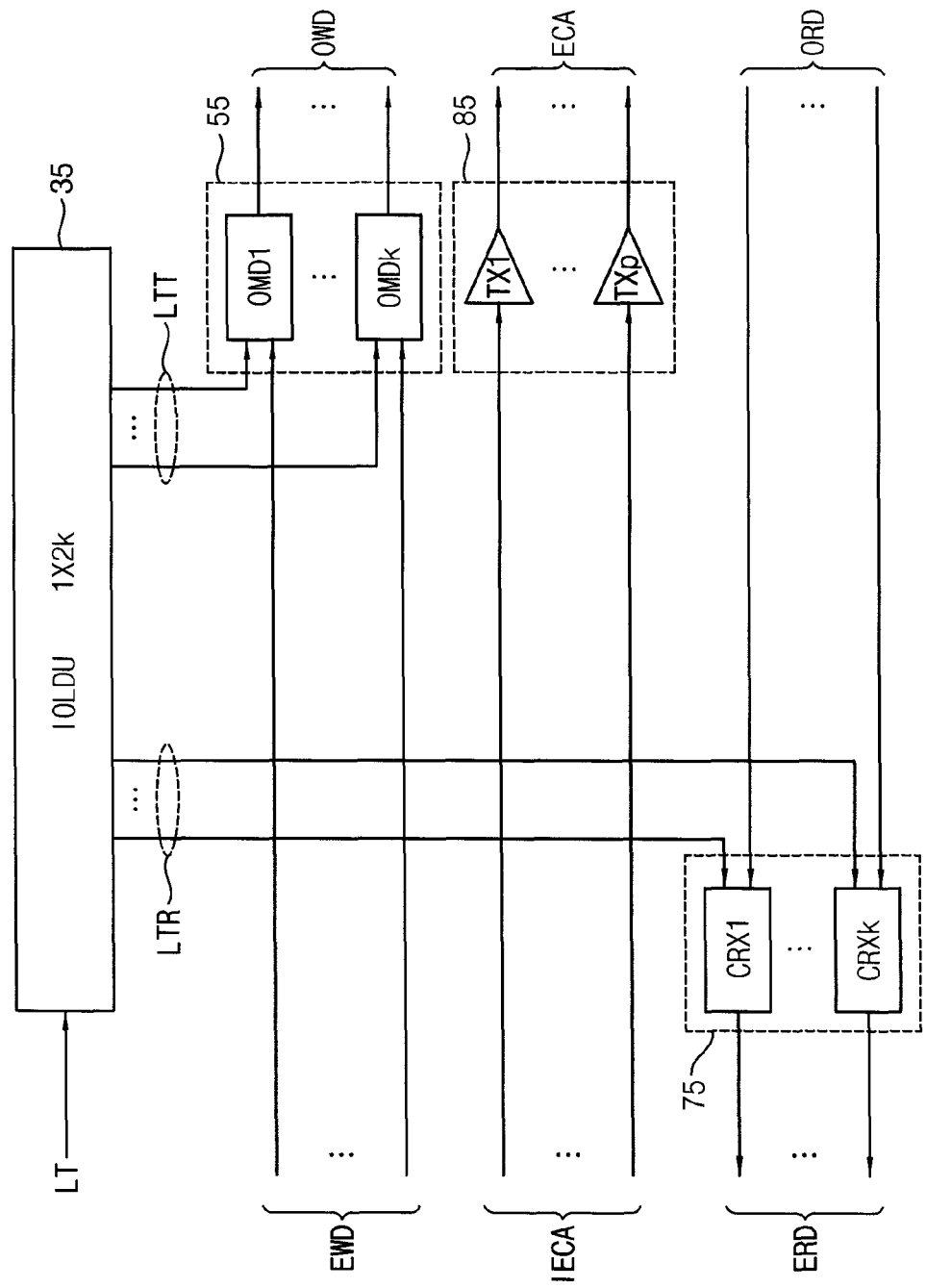
FIG. 16 is a diagram illustrating another example of the optical interface module in the memory controller in FIG. 14.

FIGS. 15 and 16 are diagrams illustrating examples of an optical interface module in the memory controller in FIG. 14.

Referring to FIG. 15, an optical interface module 14 comprises an IOLDU 34, an electrical-to-optical conversion unit 54 and a coherent optical-to-electrical conversion unit 74.

Input-output light distribution unit 34 divides received light LT to produce transmission light LTT and reception light LTR. Electrical-to-optical conversion unit 54 performs optical modulation based on transmission light LTT, an electrical write data signal EWD, and an electrical command-address signal ECA corresponding to electrical transmission signal EST. This generates an optical write data signal OWD and an optical command-address signal OCA corresponding to optical transmission signal OST. Coherent optical-to-electrical conversion unit 74 performs coherent reception based on reception light LTR and an optical read data signal ORD corresponding to optical reception signal OSR to generate an electrical read data signal ERD corresponding to electrical reception signal ESR.

Optical interface module 14 performs optical communication to exchange data with a memory module. For the optical communication, electrical-to-optical conversion unit 54 comprises k optical modulators OMD11~OMD1k configured to generate the k-bit optical write data signal OWD based on transmission light LTT and the k-bit electrical write data signal EWD, where k is a positive integer. Coherent optical-to-electrical conversion unit 74 comprises k coherent receivers CRX1~CRXk configured to generate the k-bit electrical read data signal ERD based on reception light LTR and the k-bit optical read data signal ORD.

In addition, optical interface module 14 is configured to perform optical communication to transmit commands and addresses to the memory module. For the optical communication, electrical-to-optical conversion unit 54 may further comprise p optical modulators OMD21~OMD2p configured to generate the p-bit optical command-address signal OCA based on transmission light LTT and the p-bit electrical command-address signal ECA, where p is a positive integer.

As such, where the data is transferred as the k-bit optical signals ORD and OWD and the commands and addresses are transferred as the p-bit optical signal OCA, input-output light distribution unit 34 may include an optical splitter configured to divide received light LT into 2k+p divided lights to provide the 2k+p divided lights to the k+p optical modulators OMD11~OMD1k and OMD21~2p and the k coherent receivers CRX1~CRXk, respectively.

Referring to FIG. 16, an optical interface module 15 comprises an IOLDU 35, an electrical-to-optical conversion unit 55 and a coherent optical-to-electrical conversion unit 75.

Input-output light distribution unit 35 divides a received light LT to provide a transmission light LTT and a reception light LTR. Electrical-to-optical conversion unit 55 performs an optical modulation based on transmission light LTT and an electrical write data signal EWD corresponding to electrical transmission signal EST to generate an optical write data signal OWD corresponding to optical transmission signal OST. Coherent optical-to-electrical conversion unit 75 performs a coherent reception based on reception light LTR and an optical read data signal ORD corresponding to optical reception signal OSR to generate an electrical read data signal ERD corresponding to electrical reception signal ESR.

Optical interface module 15 is configured to perform optical communication to exchange data with a memory module. For the optical communication, electrical-to-optical conversion unit 55 comprises k optical modulators OMD1~OMDk configured to generate the k-bit optical write data signal OWD based on transmission light LTT and the k-bit electrical write data signal EWD, where k is a positive integer. Coherent optical-to-electrical conversion unit 75 comprises k coherent receivers CRX1~CRXk configured to generate the k-bit electrical read data signal ERD based on reception light LTR and the k-bit optical read data signal ORD.

In addition, optical interface module 15 is configured to perform electrical communication to transmit commands and addresses to the memory module. For the electrical communication, optical interface module 15 may further comprise an electrical transmission unit 85. Electrical transmission unit 85 comprises p transmission drivers TX1~TXp configured to output the p-bit electrical command-address signal ECA to an electrical channel, where p is a positive integer.

Where the data is transferred as the k-bit optical signals ORD and OWD and the commands and addresses are transferred as the p-bit electrical signal ECA, input-output light distribution unit 35 comprises an optical splitter configured to divide received light LT into 2k divided lights to provide the 2k divided lights to the k optical modulators OMD1~OMDk and the k coherent receivers CRX1~CRXk, respectively.

Figure 17:
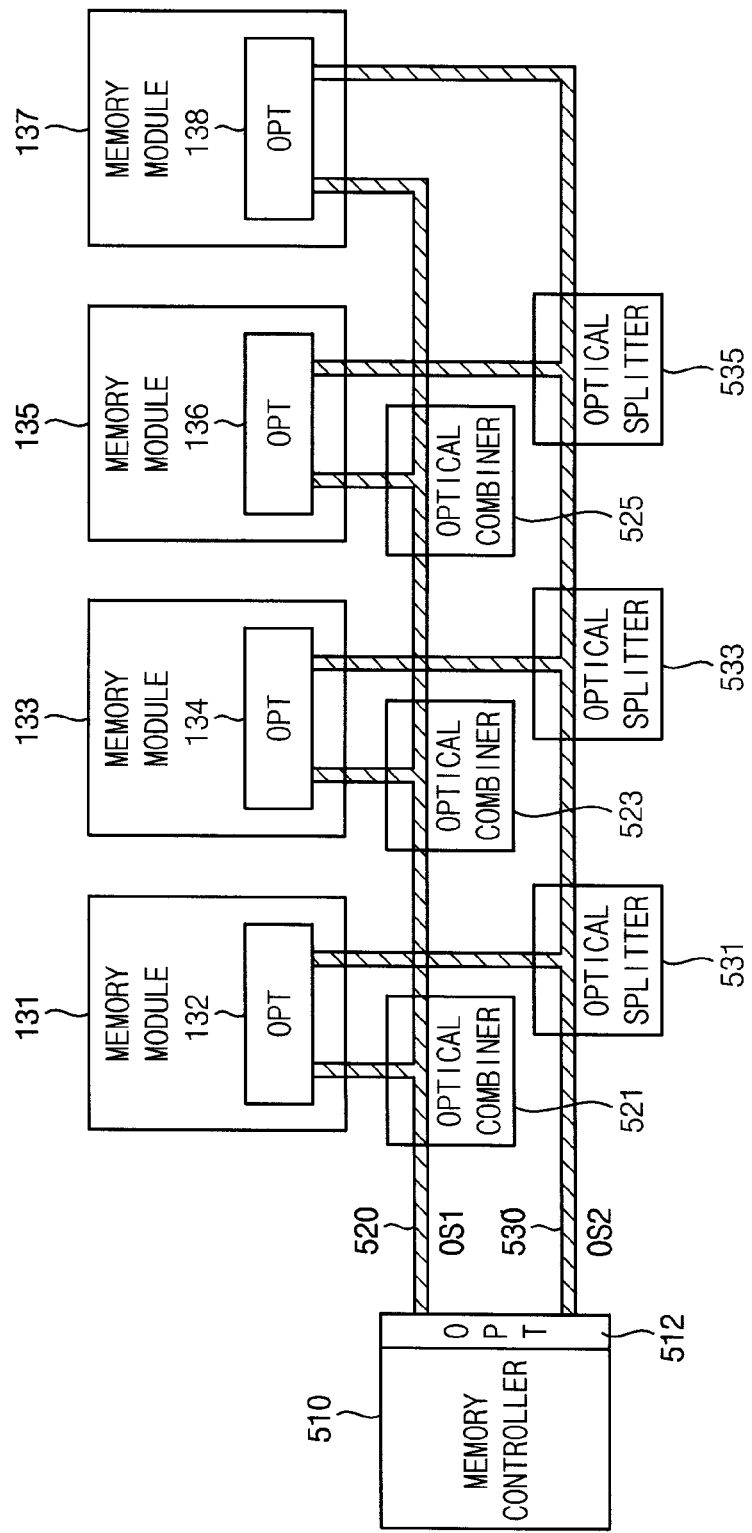
FIG. 17 is a block diagram for describing an optical connection between a memory controller and multiple memory modules.

FIG. 17 is a block diagram for describing an optical connection between a memory controller and multiple memory modules.

Referring to FIG. 17, memory modules 131, 133, 135 and 137 are coupled to memory controller 510 in a multi-drop manner. In some embodiments, memory modules 131, 133, 135 and 137 are coupled to memory controller 510 through optical couples 521, 523, 525, 531, 533 and 535.

For example, a first optical signal OS1 output from multiple optical interface modules 132, 134, 136 and 138 in memory modules 131, 133, 135 and 137 may be applied to a first optical transmission line 520 through at least one optical combiner 521, 523, and 525, and an optical interface module 512 in memory controller 510 may receive first optical signal OS1 through first optical transmission line 520. Optical interface module 512 in memory controller 510 may apply a second optical signal OS2 to a second optical transmission line 530, and optical interface modules 132, 134, 136 and 138 in memory modules 131, 133, 135 and 137 may receive second optical signal OS2 through at least one optical splitter 531, 533 and 535. In some embodiments, the first and second optical transmission lines 520 and 530 may be implemented by an optical fiber, an optical waveguide, a silicon waveguide, etc.

Although FIG. 17 illustrates an example where memory modules 131, 133, 135 and 137 are coupled to memory controller 510 in a multi-drop manner, according to an embodiment of the inventive concept, memory modules 131, 133, 135 and 137 are coupled to memory controller 510 in various manners. In some embodiments, memory modules 131, 133, 135 and 137 are coupled to memory controller 510 in a daisy chain manner. In this case, memory modules 131, 133, 135 and 137 and memory controller 510 may be coupled to each other by at least one optical switch instead of optical couples 521, 523, 525, 531, 533 and 535. The optical switch may selectively couple optical transmission lines 520 and 530 to optical interface modules 132, 134, 136 and 138.

Figure 18:
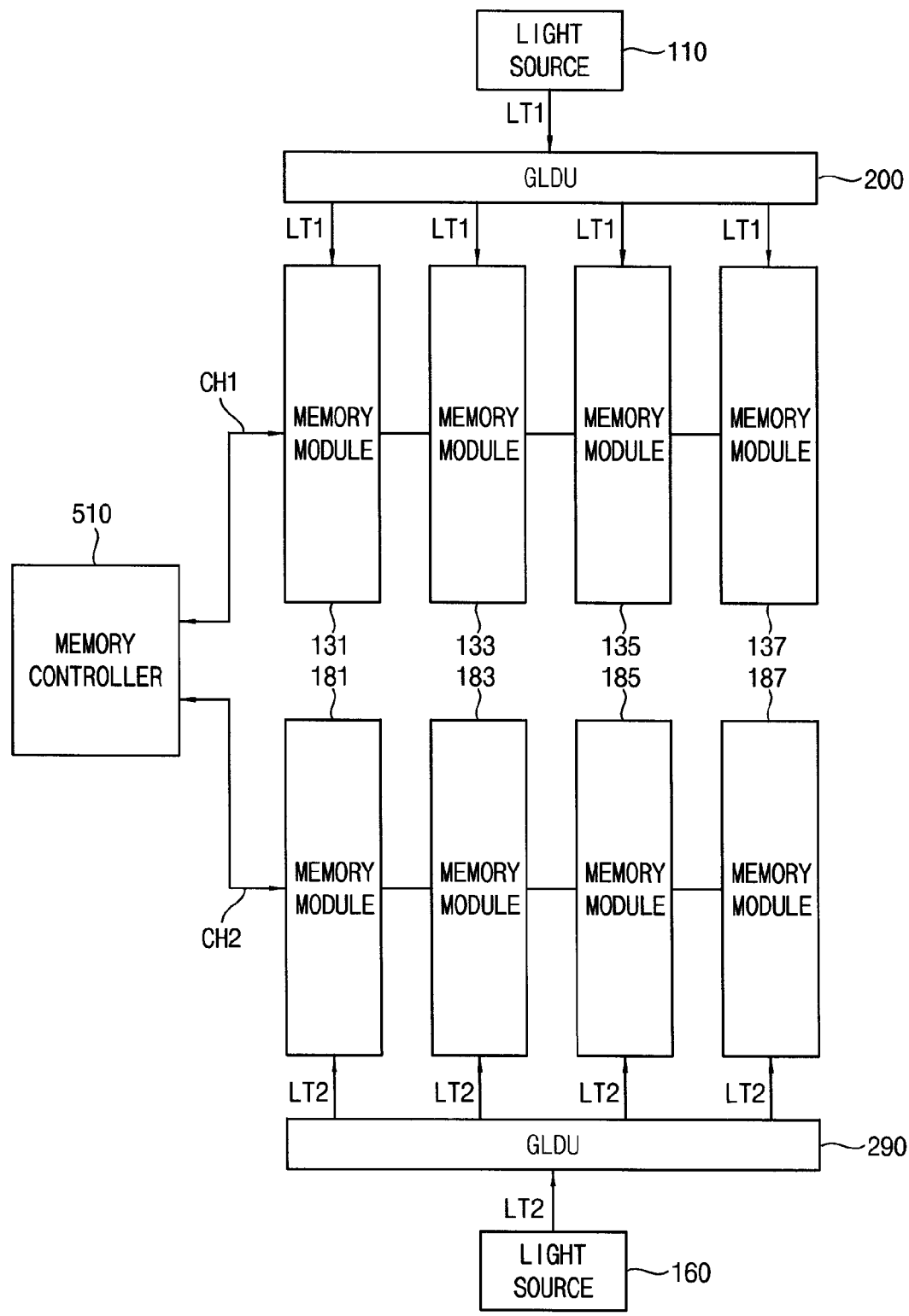
FIG. 18 is a block diagram illustrating an optical memory system having multiple channels according to an embodiment of the inventive concept.
Figure 19:
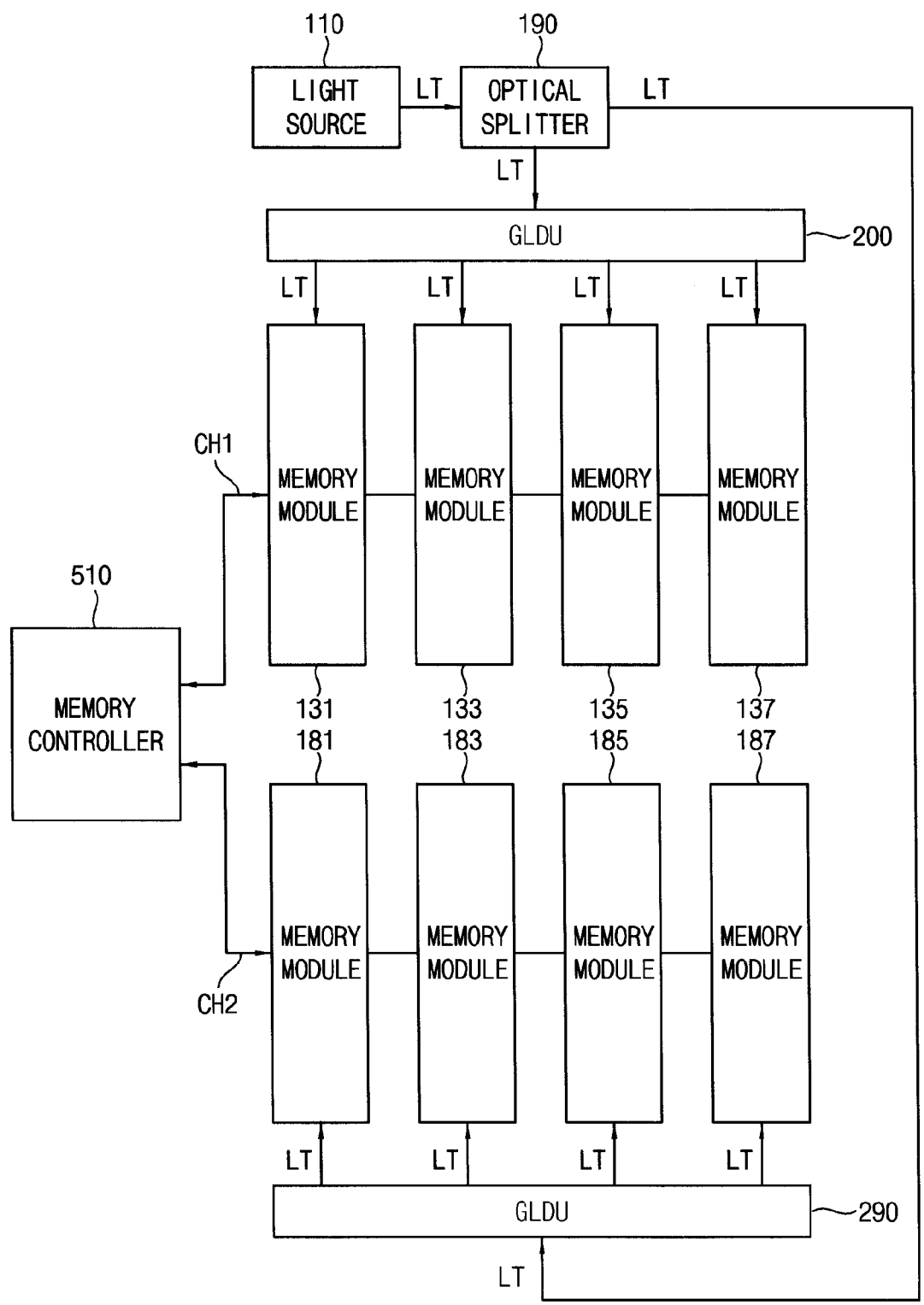
FIG. 19 is a block diagram illustrating an optical memory system having multiple channels according to another embodiment of the inventive concept.

FIGS. 18 and 19 are block diagrams illustrating an optical memory system having multiple channels according to an embodiment of the inventive concept.

Referring to FIG. 18, a memory controller 510 may have a first channel CH1 and a second channel CH2. First memory modules 131, 133, 135 and 137 comprising a first group are coupled to memory controller 510 through first channel CH1, and second memory modules 181, 183, 185 and 187 comprising a second group may be coupled to memory controller 510 through second channel CH2. First global light distribution unit 200 is coupled between first light source 110 and first memory modules 131, 133, 135 and 137, and second global light distribution unit 290 is coupled between a second light source 160 and second memory modules 181, 183, 185 and 187.

First light LT1 generated by first light source 110 is distributed to first memory modules 131, 133, 135 and 137 coupled to first channel CH1 by the first global light distribution unit 200, and first memory modules 131, 133, 135 and 137 generate an optical signal by using first light LT1 generated by first light source 110. Second light LT2 generated by second light source 160 is distributed to second memory modules 181, 183, 185 and 187 coupled to second channel CH2 by second global light distribution unit 290, and second memory modules 181, 183, 185 and 187 generates an optical signal using second light LT2 generated by second light source 160.

As illustrated in FIG. 18, memory controller 510 may comprise multiple channels CH1 and CH2, one light source may be provided per channel, and multiple memory modules coupled to each channel may share the one light source.

Referring to FIG. 19, memory controller 510 has a first channel CH1 and a second channel CH2. First memory modules 131, 133, 135 and 137 are coupled to memory controller 510 through first channel CH1, and second memory modules 181, 183, 185 and 187 are coupled to memory controller 510 through second channel CH2. Light source 110 is coupled to an optical splitter 190. First global light distribution unit 200 is coupled between optical splitter 190 and first memory modules 131, 133, 135 and 137, and second global light distribution unit 290 is coupled between optical splitter 190 and second memory modules 181, 183, 185 and 187.

Optical splitter 190 splits light LT generated by light source 110, and it provides the split lights to the first and second global light distribution units 200 and 290, respectively. First global light distribution unit 200 distributes light LT received from light source 110 through optical splitter 190 to first memory modules 131, 133, 135 and 137 coupled to first channel CH1, and second global light distribution unit 290 distributes light LT received from light source 110 through optical splitter 190 to second memory modules 181, 183, 185 and 187 coupled to second channel CH2.

As illustrated in FIG. 19, one light source 110 is provided, and all memory modules 131, 133, 135, 137, 181, 183, 185 and 187 share the one light source 110.

Figure 20:
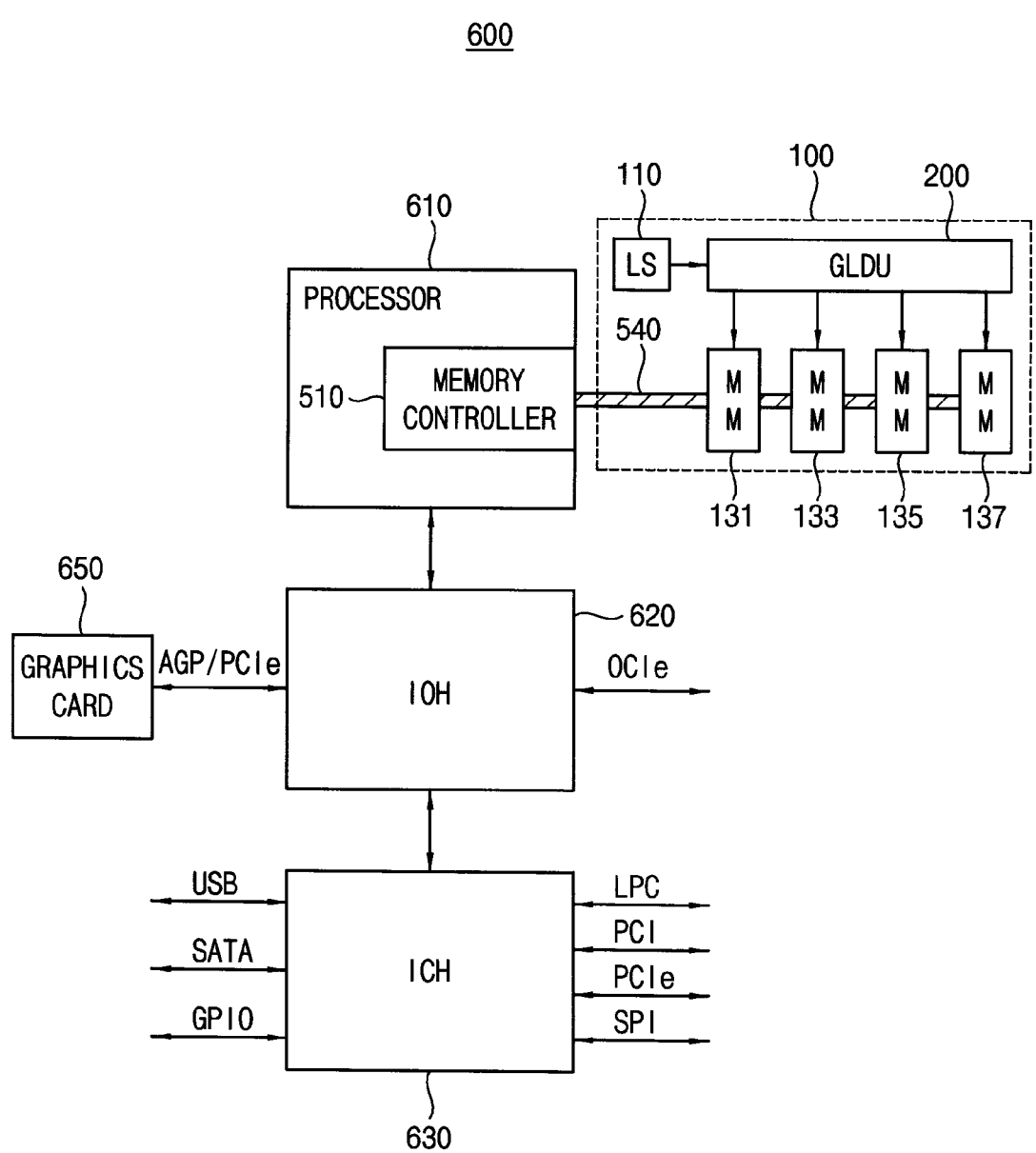
FIG. 20 is a block diagram illustrating a computing system comprising an optical memory system according to an embodiment of the inventive concept.

FIG. 20 is a block diagram illustrating a computing system comprising an optical memory system according to an embodiment of the inventive concept.

Referring to FIG. 20, a computing system 600 comprises a processor 610, an input-output hub 620, an input-output controller hub 630, a graphic card 650 and an optical memory system 100. Computing system 600 may be any computing system, such as a personal computer (PC), a server computer, a workstation, a tablet computer, a laptop computer, etc.

Processor 610 may be mounted on a board 670, such as shown, for example, in FIG. 15, such as a motherboard, a main board, or the like. Processor 610 may perform specific calculations or tasks. For example, processor 610 may be a microprocessor, a central process unit (CPU), a digital signal processor, or the like. Processor 610 may include any number of processor cores. For example, processor 610 may be a single core processor or a multi-core processor, such as a dual-core processor, a quad-core processor, a hexa-core processor, etc. In an alternative embodiment, computing system 600 comprises multiple processors.

Processor 610 comprises a memory controller 510 that controls an operation of optical memory system 100. Memory controller 510 in processor 610 may be referred to as an integrated memory controller (IMC). A memory interface between memory controller 510 and optical memory system 100 may be implemented by at least one channel comprising at least one optical transmission line 540. In an alternative embodiment, memory controller 510 may be in input-output hub 620. Input-output hub 620 comprising memory controller 510 may be referred to as a memory controller hub (MCH).

Optical memory system 100 comprises at least one light source 110, global light distribution unit 200 and multiple memory modules 131, 133, 135 and 137. Global light distribution unit 200 distributes light generated by light source 110 to memory modules 131, 133, 135 and 137. Memory modules 131, 133, 135 and 137 comprise optical interface modules configured to perform optical modulation and coherent reception by using the light received from light source 110 via global light distribution unit 200. The optical interface modules may be coupled to memory controller 510 through optical transmission line 540. According to some embodiments of the inventive concept, light source 110 may be mounted on board 670 illustrated in FIG. 21, or may be implemented as a rack-type light source located outside board 670 illustrated in FIG. 21.

Input-output hub 620 manages data transfer between processor 610 and devices, such as graphic card 650. Input-output hub 620 may be coupled to processor 610 via one of various interfaces including a front side bus (FSB), a system bus, a HyperTransport, a lightning data transport (LDT), a QuickPath interconnect (QPI), and a common system interface (CSI). Input-output hub 620 may provide various interfaces with the devices including an accelerated graphics port (AGP) interface, a peripheral component interface-express (PCIe), and a communications streaming architecture (CSA) interface. In an alternative embodiment, computing system 600 comprises multiple input-output hubs. Graphic card 650 may be coupled to the input-output hub 620 via the AGP or the PCIe. Graphic card 650 may control a display device for displaying an image.

Input-output controller hub 630 may perform data buffering and interface arbitration to efficiently operate various system interfaces. Input-output controller hub 630 may be coupled to the input-output hub 620 via one of various interfaces, such as a direct media interface (DMI), a hub interface, an enterprise Southbridge interface (ESI), and PCIe. Input-output controller hub 630 may provide various interfaces with peripheral devices. For example, input-output controller hub 630 may provide a universal serial bus (USB) port, a serial advanced technology attachment (SATA) port, a general purpose input-output (GPIO), a low pin count (LPC) bus, a PCI, and a PCIe.

As described above, in computing system 600, memory controller 510 and optical memory system 100 may be coupled through optical transmission line 540. Accordingly, in computing system 600, an impedance mismatch may not occur, and signal integrity may not deteriorate although the number of memory modules 131, 133, 135 and 137 coupled to memory controller 510 increases. Further, in computing system 600, memory modules 131, 133, 135 and 137 may share light source 110, thereby readily increasing the number of memory modules and readily increasing a system memory capacity.

Figure 21:
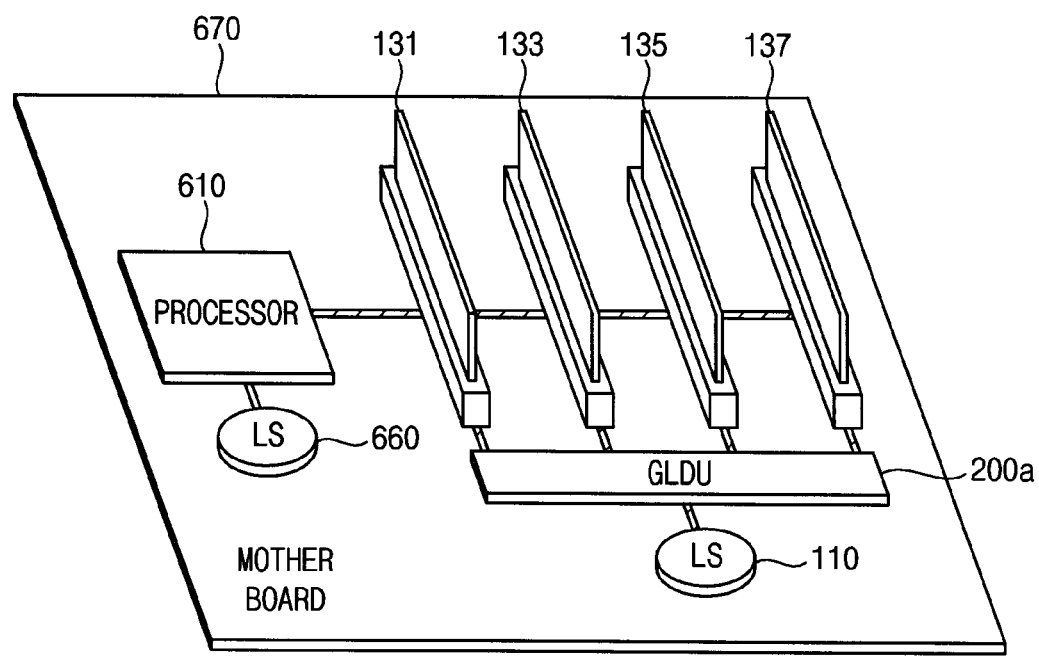
FIG. 21 is a diagram an optical memory system having a light source arrangement according to an embodiment of the inventive concept.
Figure 22:
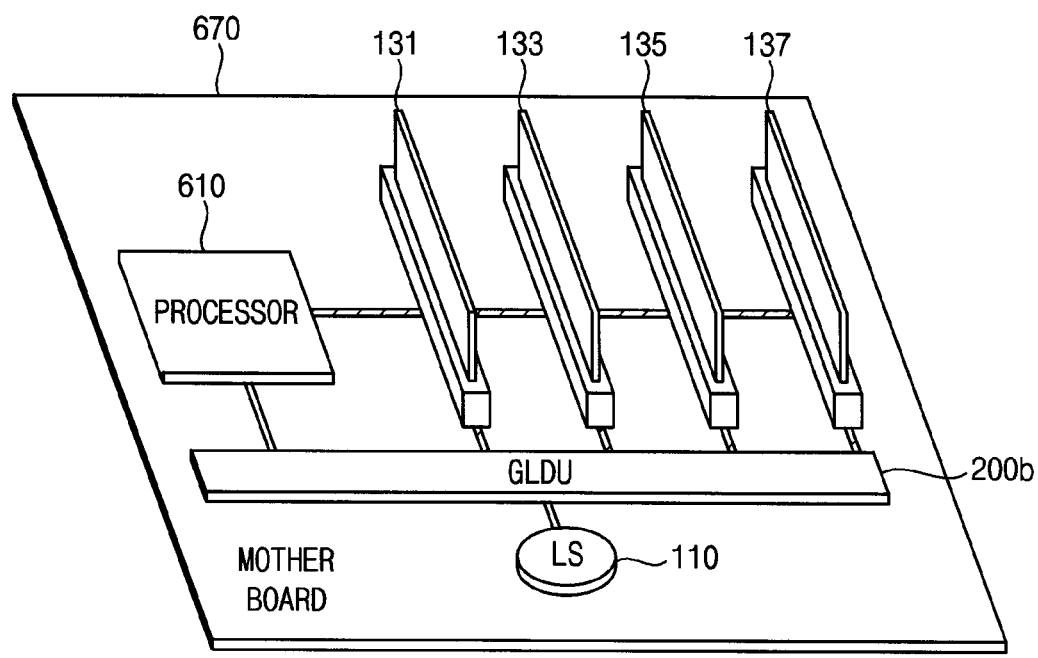
FIG. 22 is a diagram an optical memory system having a light source arrangement according to another embodiment of the inventive concept.

FIGS. 21 and 22 are diagrams for describing a light source arrangement in an optical memory system according to an embodiment of the inventive concept.

Referring to FIG. 21, a computing system 600a comprises a board 670, a processor 610 and an optical memory system. The optical memory system comprises light sources 110 and 660, a global light distribution unit 200a and multiple memory modules 131, 133, 135 and 137.

For example, board 670 may be a motherboard, a main board, or the like. Processor 610 may be mounted on board 670, and may include a memory controller that controls the optical memory system. Processor 610 receives light from dedicated light source 660. Global light distribution unit 200a distributes light generated by light source 110 to memory modules 131, 133, 135 and 137. Memory modules 131, 133, 135 and 137 perform optical modulation and coherent reception using the light received from light source 110 via global light distribution unit 200a.

As illustrated in FIG. 21, light source 110 may be located outside each memory module 131, 133, 135 and 137, and may be mounted on board 670. Memory modules 131, 133, 135 and 137 may share light source 110 mounted on board 670.

FIG. 21 illustrates a configuration that memory modules 131, 133, 135 and 137 share the one light source 110 but light source 600 for processor 611 is separated from light source 110 for memory modules 131, 133, 135 and 137. In this configuration, the wavelength of the optical signals may be different from the wavelength of reception light TLR for coherent reception, and thus the memory system may be implemented with the coherent receiver of the heterodyne type in addition to the homodyne type.

Referring to FIG. 22, a computing system 600b comprises a board 670, a processor 610 and an optical memory system. The optical memory system comprises a light source 110, a global light distribution unit 200b and multiple memory modules 131, 133, 135 and 137.

Board 670 may be, e.g., a motherboard, a main board, or the like. Processor 610 is mounted on board 670 and comprises a memory controller that controls the optical memory system. Global light distribution unit 200b distributes light generated by light source 110 to memory modules 131, 133, 135 and 137 and processor 610.

FIG. 22 illustrates a configuration in which processor 610 and memory modules 131, 133, 135 and 137 share the one light source 110. In this configuration, the wavelength of the optical signals is the same as the wavelength of reception light TLR for coherent reception, and thus the memory system may be implemented with the coherent receiver of the homodyne type. The system using the homodyne receive has an advantage of not requiring an additional frequency-locking device.

Figure 23:
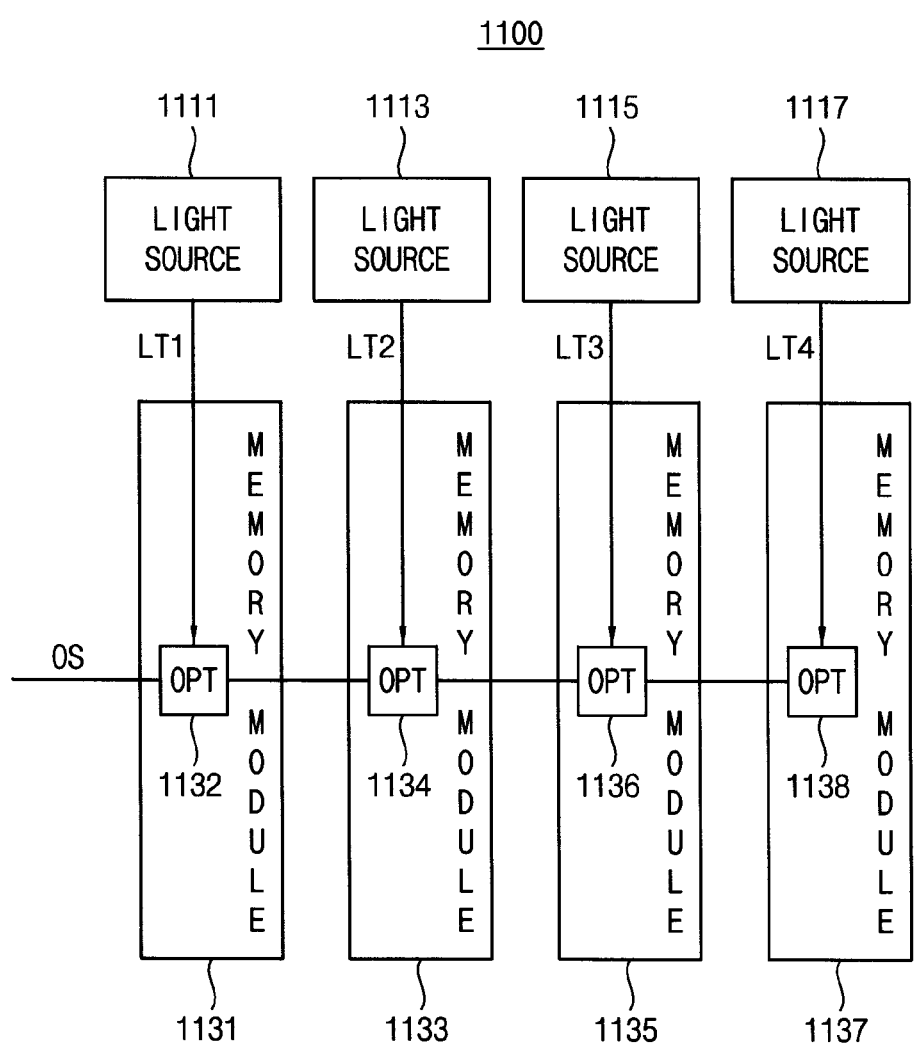
FIG. 23 is a block diagram illustrating an optical memory system comprising multiple memory modules with respective light sources according to an embodiment of the inventive concept.

FIG. 23 is a block diagram illustrating an optical memory system comprising multiple memory modules with respective light sources according to an embodiment of the inventive concept.

Referring to FIG. 23, an optical memory system 1100 comprises multiple light sources 1111, 1113, 1115 and 1117 and multiple memory modules 1131, 1133, 1135 and 1137.

Light sources 1111, 1113, 1115 and 1117 generate multiple lights LT1, LT2, LT3 and LT4, respectively. Light sources 1111, 1113, 1115 and 1117 may be coupled to memory modules 1131, 1133, 1135 and 1137, respectively, and may provide lights LT1, LT2, LT3 and LT4 to memory modules 1131, 1133, 1135 and 1137, respectively. For example, a first light source 1111 may be coupled to a first memory module 1131 and provides first light LT1 to a first optical interface module 1132 in first memory module 1131. A second light source 1113 is coupled to a second memory module 1133 and provides second light LT2 to a second optical interface module 1134 in second memory module 1132. A third light source 1115 is coupled to a third memory module 1135 and provides third light LT3 to a third optical interface module 1136 in third memory module 1135. A fourth light source 1117 is coupled to a fourth memory module 1137 and provides fourth light LT4 to a fourth optical interface module 1138 in fourth memory module 1137. As illustrated in FIG. 23, optical memory system 1100 comprises one light source per memory module.

As described above, each of optical interface modules 1132, 1134, 1136 and 1138 includes an input-output light distribution unit configured to divide a received light to provide a transmission light and a reception light, an electrical-to-optical conversion unit configured to perform an optical modulation based on the transmission light and an electrical transmission signal to generate an optical transmission signal, and a coherent optical-to-electrical conversion unit configured to perform a coherent reception based on the reception light and an optical reception signal to generate an electrical reception signal.

Figure 24:
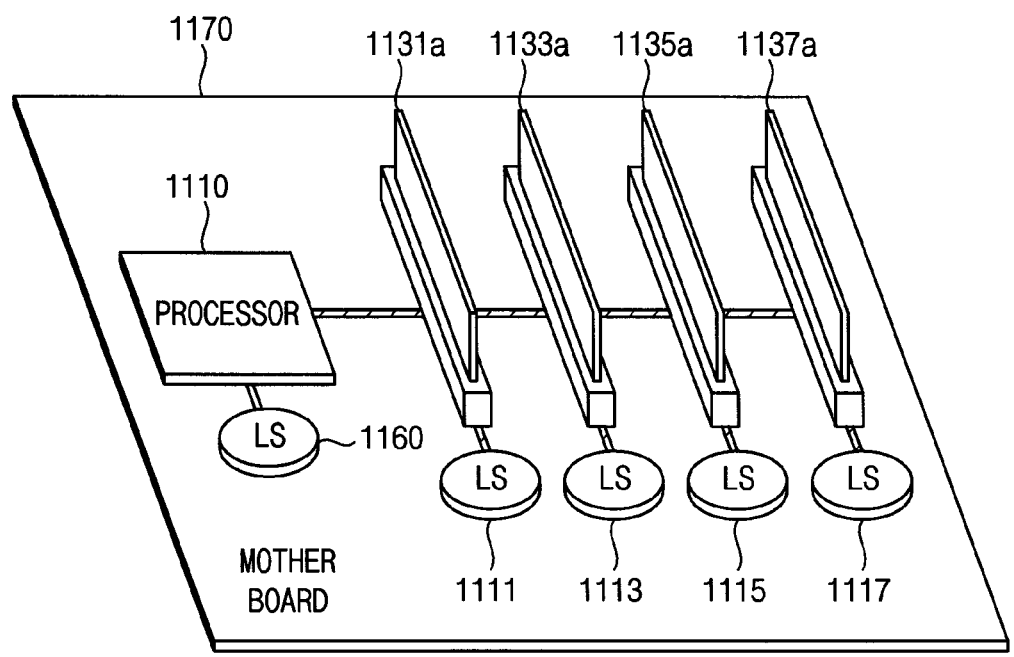
FIG. 24 is a diagram of an optical memory system having a light source arrangement according to an embodiment of the inventive concept.
Figure 25:
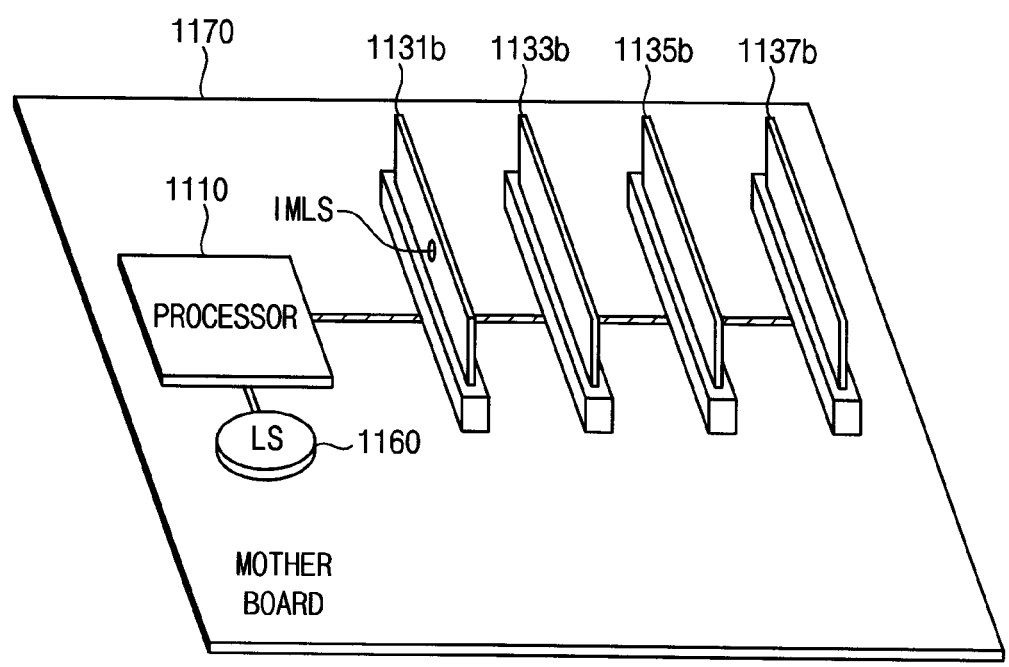
FIG. 25 is a diagram of an optical memory system having a light source arrangement according to another embodiment of the inventive concept.

FIGS. 24 and 25 are diagrams an optical memory system having a light source arrangement according to an embodiment of the inventive concept.

Referring to FIG. 24, a computing system 1100a comprises a board 1170, a processor 1110 and an optical memory system. The optical memory system comprises light sources 1111, 1113, 1115, 1117 and 160 and memory modules 1131a, 1133a, 1135a and 1137a.

Processor 1110 is mounted on board 1170 and comprises a memory controller that controls the optical memory system. Each light source 1111, 1113, 1115, 1117 and 1160 is coupled to a corresponding one of memory modules 1131a, 1133a, 1135a and 1137a and processor 1110 and provides light to the corresponding one of memory modules 1131, 1133, 1135 and 1137 and processor 1110.

In some embodiments, as illustrated in FIG. 24, light sources 1111, 1113, 1115, 1117 and 1160 are located outside memory modules 1131a, 1133a, 1135a and 1137a and processor 1110, and may be mounted on board 1170. In other embodiments, light sources 1111, 1113, 1115, 1117 and 1160 may be implemented as rack-type light sources located outside board 1170.

Referring to FIG. 25, a computing system 1100b comprises a board 1170, a processor 1110 and an optical memory system. The optical memory system comprises a light source 160 and multiple memory modules 1131b, 1133b, 1135b and 1137b.

Processor 1110 is mounted on board 1170, and it comprises a memory controller that controls the optical memory system. Light source 1160 may be coupled to processor 1110, and may provide light to processor 1110.

As described with reference to FIGS. 26 and 27, at least one of memory modules 1131b, 1133b, 1135b and 1137b may be a master memory module comprising an in-module light source IMLS.

Figure 27:
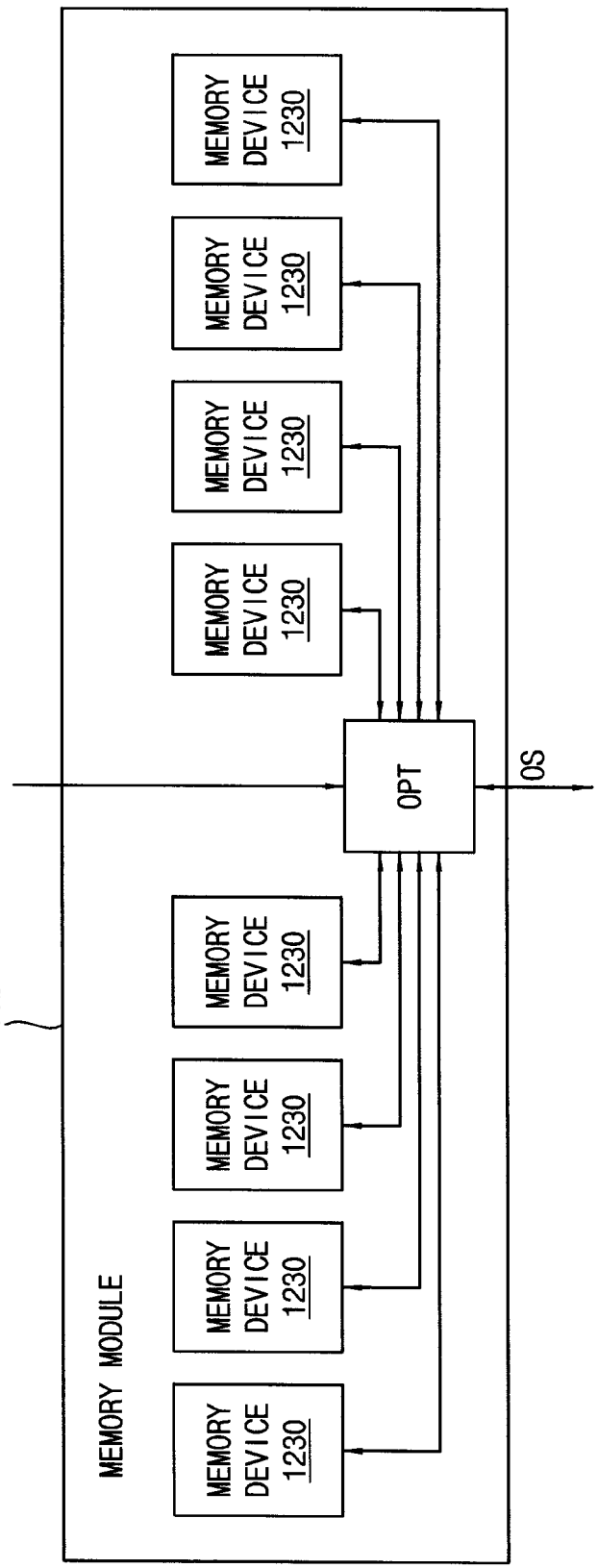
FIG. 27 is a diagram illustrating another example of a memory module in the optical memory system of FIG. 25.

FIGS. 26 and 27 are diagrams illustrating examples of a memory module in the optical memory system of FIG. 25.

Each of memory modules 1131b and 1133b comprises multiple memory devices and an optical interface module OPT. As described above, optical interface module OPT comprises an input-output light distribution unit configured to divide a received light to provide a transmission light and a reception light, an electrical-to-optical conversion unit configured to perform an optical modulation based on the transmission light and an electrical transmission signal to generate an optical transmission signal, and a coherent optical-to-electrical conversion unit configured to perform a coherent reception based on the reception light and an optical reception signal to generate an electrical reception signal.

FIG. 26 illustrates a master memory module 1131b comprising an in-module light source IMLS for generating a light LT internally, and FIG. 27 illustrates a slave memory module 1133b that does not include a light source and receives a light LT from an external source. Slave memory module 1133b may be supplied with light LT from master memory module 1131b through an optical waveguide etc. Formed in mother board 1170.

Figure 28:
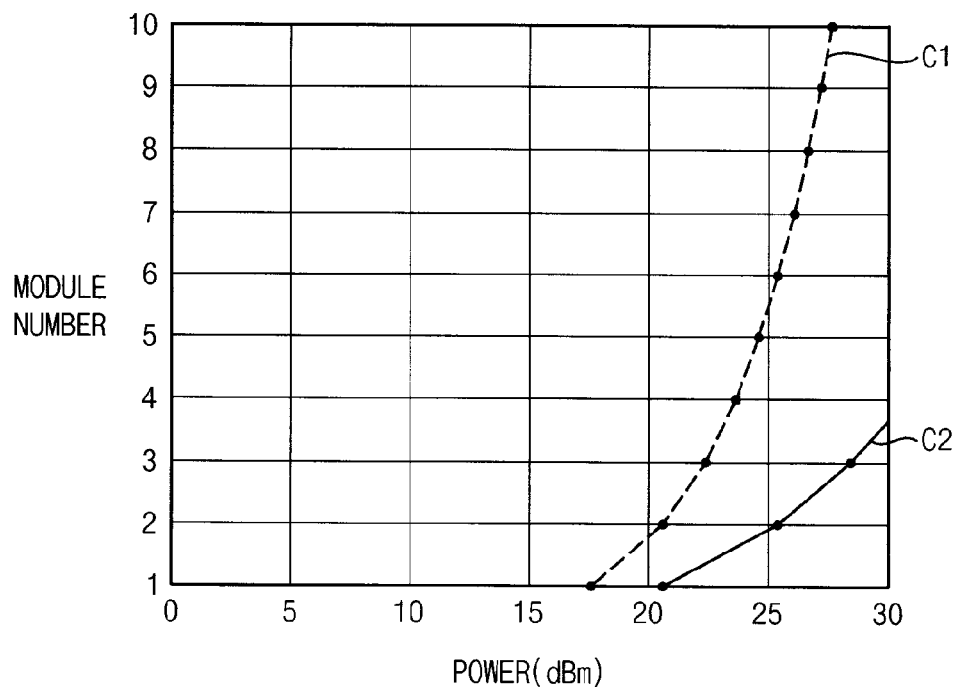
FIG. 28 is a diagram illustrating expandability of an optical memory system according to an embodiment of the inventive concept.
Figure 29:
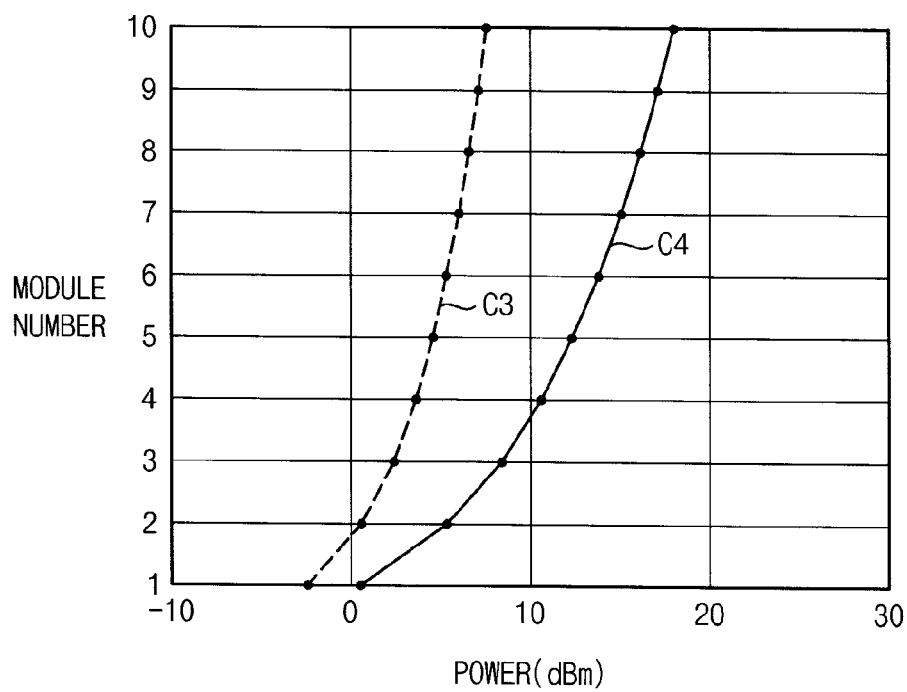
FIG. 29 is another diagram illustrating expandability of an optical memory system according to an embodiment of the inventive concept.

FIGS. 28 and 29 are diagrams for describing expandability of an optical memory system according to an embodiment of the inventive concept.

In FIGS. 28 and 29, the horizontal axis represents an output power of a light source in dBm unit, and the vertical axis represents the number of memory modules that may be coupled to a memory controller or a processor including the memory control function. FIG. 28 illustrates direct reception and FIG. 29 illustrates coherent reception. Curves C1 and C3 represent simulation results where the memory modules use the respective light sources, and curves C2 and C4 represent simulation results where the memory modules share one light source.

The simulation results of FIGS. 28 and 29 are based on conditions that each memory module includes nine optical interface modules and each optical interface module includes ten transmitters and ten receivers for optical communication of ten-bit signal. Considering the general optical communication of 10 Gbps, the maximum power of the optical transmitter has been set to +20 dBm, the sensitivity of the optical receiver has been set to −15 dBm, and the losses of the optical coupler, the optical modulator and the optical waveguide have been set to 5 dB, 5 dB and 3 dB, respectively.

Referring to FIG. 28, the number of the memory modules coupled to the one processor is limited up to two in case of one light source per memory module, and it is difficult to couple one memory module to the one processor in case of the shared light source. Referring to FIG. 29, when the coherent reception is adopted, ten or more memory modules may be coupled to the one processor. The power consumption may be significantly by reducing the number of the used optical memory modules, or system expandability may be enhanced according to an embodiment of the inventive concept.

Figure 30:
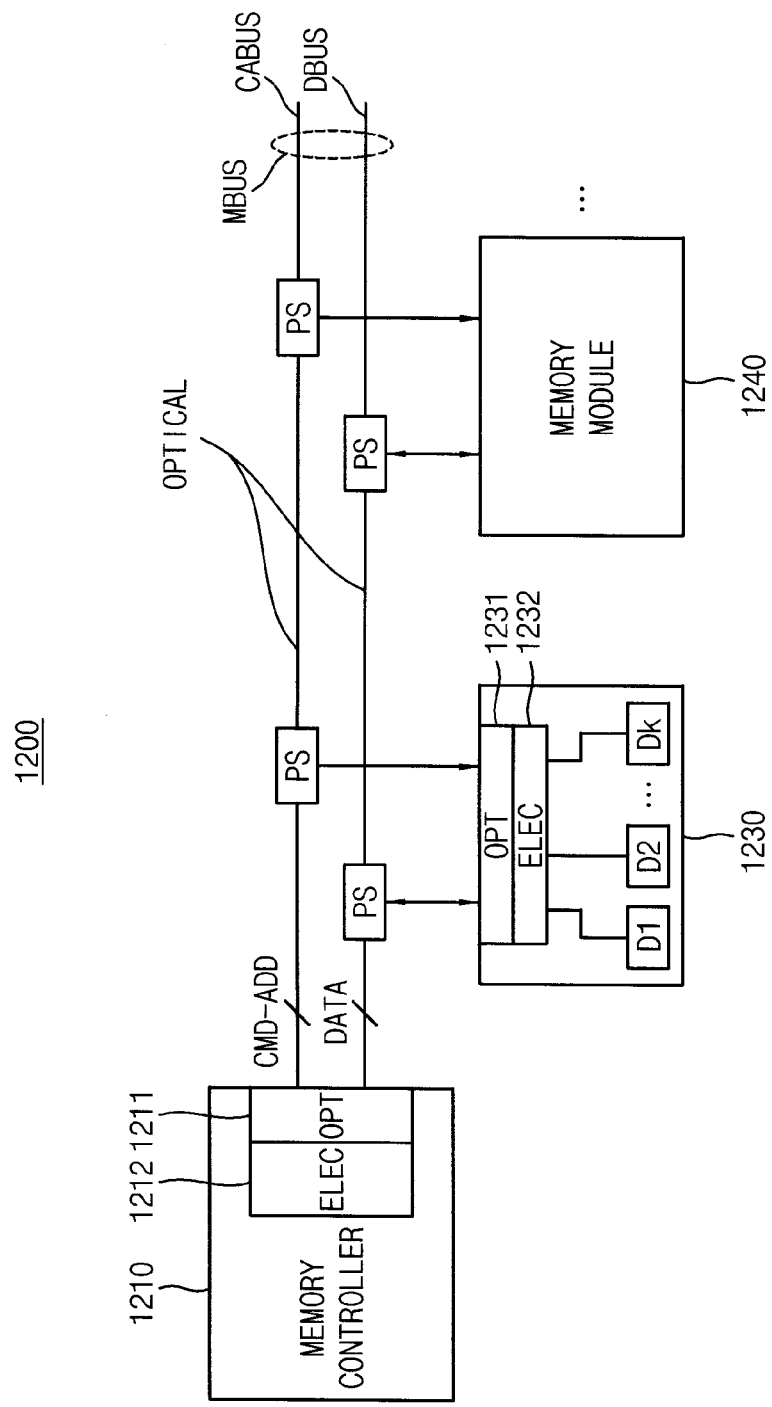
FIG. 30 is a block diagram illustrating a system according to an embodiment of the inventive concept.
Figure 31:
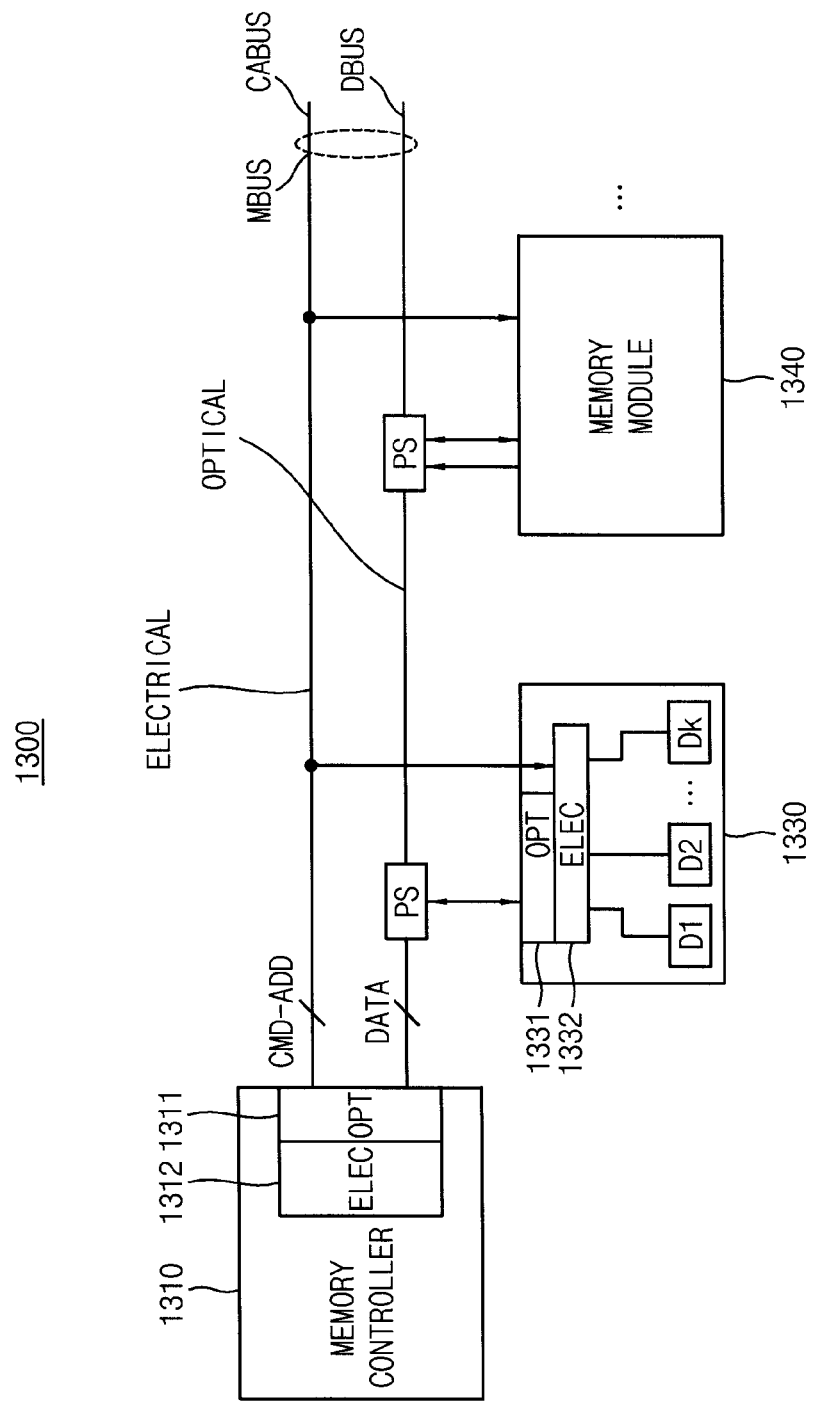
FIG. 31 is a block diagram illustrating a system according to another embodiment of the inventive concept.

FIGS. 30 and 31 are block diagrams illustrating a system according to an embodiment of the inventive concept.

The light sources are omitted in FIGS. 30 and 31 for convenience of illustration. As described above, the light sources may be disposed in the optical memory module, in the mother board, outside the memory system, etc.

Referring to FIG. 30, a memory system 1200 comprises a memory controller 1210, multiple memory modules 1230 and 1240 and a memory bus MBUS connecting memory controller 1210 and memory modules 1230 and 1240. Memory modules 1230 and 1240 may have substantially the same configuration.

Memory controller 1210 and memory module 1230 comprise optical interfaces (OPT) 1211 and 1231 and electrical interfaces (ELEC) 1212 and 1232, respectively. As described above, each of optical interface modules 1211 and 1231 includes an input-output light distribution unit configured to divide a received light to provide a transmission light and a reception light, an electrical-to-optical conversion unit configured to perform an optical modulation based on the transmission light and an electrical transmission signal to generate an optical transmission signal, and a coherent optical-to-electrical conversion unit configured to perform a coherent reception based on the reception light and an optical reception signal to generate an electrical reception signal. Memory module 1230 comprises multiple memory devices D1, D2 and Dk coupled to electrical interface 1232.

Memory bus MBUS comprises a data bus DBUS implemented with at least one optical waveguide and a command-address bus CABUS implemented with at least one optical waveguide. Command-address signal CMD-ADD and data signal DATA transferred between memory controller 1210 and memory modules 1230 and 1240 may be optical signals.

The channels of memory bus MBUS may be implemented with a broadcasting optical channel that is configured to transfer an optical signal simultaneously to memory modules 1230 and 1240. The broadcasting optical channel comprises an optical waveguide and multiple power splitters PSs sequentially inserted along the optical waveguide. Power splitters PSs are coupled to memory modules 1230 and 1240, respectively.

Referring to FIG. 31, a memory system 1300 comprises a memory controller 1310, multiple memory modules 1330 and 1340, and a memory bus MBUS connecting memory controller 1310 and memory modules 1330 and 1340. Memory modules 1330 and 1340 may have substantially the same configuration.

Memory controller 1310 and memory module 1330 comprise optical interfaces (OPT) 1311 and 1331 and electrical interfaces (ELEC) 1312 and 1332, respectively. As described above, each of optical interface modules 1211 and 1231 includes an input-output light distribution unit configured to divide a received light to provide a transmission light and a reception light, an electrical-to-optical conversion unit configured to perform an optical modulation based on the transmission light and an electrical transmission signal to generate an optical transmission signal, and a coherent optical-to-electrical conversion unit configured to perform a coherent reception based on the reception light and an optical reception signal to generate an electrical reception signal. Memory module 1330 comprises multiple memory devices D1, D2 and Dk coupled to electrical interface 1332.

Memory bus MBUS comprises a data bus DBUS implemented with at least one optical waveguide and a command-address bus CABIS implemented with an electrical transmission line. Command-address signal CMD-ADD transferred between memory controller 1310 and memory modules 1330 and 1340 may be electrical signals and data signal DATA transferred between memory controller 1310 and memory modules 1330 and 1340 may be optical signals.

The channels of data bus DBUS may be implemented with a broadcasting optical channel that is configured to transfer an optical signal simultaneously to memory modules 1330 and 1340. The broadcasting optical channel comprises an optical waveguide and multiple power splitters PSs sequentially inserted along the optical waveguide. Power splitters PSs are coupled to memory modules 1330 and 1340, respectively.

As described above, the optical interface module, the optical memory module and the optical memory system may use coherent reception of high sensitivity and may enhance system expandability by increasing the number of memory modules that may be coupled to the one memory controller or the processor.

In addition, the optical interface module, the optical memory module, and the optical memory system does not require a conventional local oscillating light source for the coherent reception, but may perform the coherent reception of high sensitivity by dividing the light for the optical modulation. Thus the number of light sources may be reduced and relatively efficient optical communication of low power and high reliability may be performed without increasing system size and design burden.

Embodiments of the inventive concept may be applied to systems operating in high-frequency environments to reduce power consumption and enhance system expandability. For example, the inventive concept may be applied to systems such as a memory card, a solid state drive (SSD), a mobile phone, a smart phone, a personal digital assistant (PDA), a portable multimedia player (PMP), a digital camera, a music player, a portable game console, a navigation system, etc.

The foregoing is illustrative of embodiments and is not to be construed as limiting thereof. Although a few embodiments have been described, those skilled in the art will readily appreciate that many modifications are possible in the embodiments without materially departing from the scope of the inventive concept. Accordingly, all such modifications are intended to be included within the scope of the inventive concept as defined in the claims.

What is claimed is:

1. An optical memory module, comprising:
   one or more memory devices configured to store data; and
   one or more optical interface modules configured to perform optical communication between the memory devices and an external device, each of the optical interface modules comprising:
      an input-output light distribution unit configured to divide received light to produce transmission light and reception light;
      an electrical-to-optical conversion unit configured to perform optical modulation based on the transmission light and an electrical transmission signal to generate an optical transmission signal; and
      a coherent optical-to-electrical conversion unit configured to perform a coherent reception based on the reception light and an optical reception signal to generate an electrical reception signal, wherein:
      the electrical-to-optical conversion unit comprises k optical modulators configured to generate a k-bit optical read data signal based on the transmission light and a k-bit electrical read data signal,
      the coherent optical-to-electrical conversion unit comprises k coherent receivers configured to receive the reception light and to generate a k-bit electrical write data signal based on the reception light and a k-bit optical write data signal, and
      k is a positive integer greater than 1.

2. The optical memory module of claim 1, wherein the coherent optical-to-electrical conversion unit further comprises p additional coherent receivers configured to generate a p-bit electrical command-address signal based on the reception light and a p-bit optical command-address signal, where p is a positive integer.

3. The optical memory module of claim 2, wherein the input-output light distribution unit comprises an optical splitter configured to divide the received light into 2k+p divided lights to provide the 2k+p divided lights to the k optical modulators and the k+p coherent receivers, respectively.

4. The optical memory module of claim 1, further comprising p reception buffers configured to receive a p-bit electrical command-address signal that is transferred through an electrical channel, where p is a positive integer.

5. The optical memory module of claim 4, wherein the input-output light distribution unit includes an optical splitter configured to divide the received light into 2k divided lights to provide the 2k divided lights to the k optical modulators and the k coherent receivers, respectively.

6. The optical memory module of claim 1, further comprising a module light distribution unit configured to divide light into multiple divided lights to provide the divided lights to the optical interface modules, respectively.

7. The optical memory module of claim 6, wherein the module light distribution unit receives the light from a light source or global light distribution unit disposed outside the optical memory module.

8. The optical memory module of claim 6, further comprising an in-module light source configured to generate the light to be provided to the module light distribution unit.

9. The optical memory module of claim 1, wherein the electrical-to-optical conversion unit is coupled to a first unidirectional channel to output the optical transmission signal to the first unidirectional channel, and the coherent optical-to-electrical conversion unit is coupled to a second unidirectional channel to receive the optical reception signal from the second unidirectional channel.

10. The optical memory module of claim 1, further comprising a transmission-reception path combiner coupled to a bidirectional channel to transfer the optical transmission signal from the electrical-to-optical conversion unit to the bidirectional channel and to transfer the optical reception signal from the bidirectional channel to the coherent optical-to-electrical conversion unit.

11. The optical memory module of claim 1, wherein the input-output light distribution unit is configured to divide the received light into first multiple divided lights and second multiple divided lights to provide the first multiple divided lights to the k optical modulators and the second multiple divided lights to the k coherent receivers, respectively.

12. An optical memory system comprising:
   at least one light source configured to generate light;
   one or more memory modules configured to store data; and
   a memory controller configured to control the memory modules, each of the memory modules comprising one or more optical interface modules configured to perform optical communication between the memory module and the memory controller, using the light from the light source, each of the optical interface modules comprising:
      an input-output light distribution unit configured to divide received light to produce transmission light and reception light;
      an electrical-to-optical conversion unit configured to perform optical modulation based on the transmission light and an electrical transmission signal to generate an optical transmission signal; and
      a coherent optical-to-electrical conversion unit configured to perform coherent reception based on the reception light and an optical reception signal to generate an electrical reception signal, wherein:
      the electrical-to-optical conversion unit comprises multiple optical modulators, each optical modulator configured to generate a corresponding bit of an optical read data signal based on the transmission light and a corresponding bit of an electrical read data signal, and
      the coherent optical-to-electrical conversion unit comprises multiple coherent receivers, each coherent receiver configured to generate a corresponding bit of an electrical write data signal based on the reception light and a corresponding bit of an optical write data signal.

13. The optical memory system of claim 12, further comprising a global light distribution unit configured to distribute the light from the light source to the memory modules.

14. The optical memory system of claim 13, wherein the light source is configured to change a wavelength of the light in response to a control signal from the memory controller, and the global light distribution unit includes a wavelength division multiplexing (WDM) demultiplexer configured to generate multiple lights having different wavelengths from each other by dividing the light generated by the light source according to the wavelengths, and may provide the lights having the different wavelengths to the memory modules, respectively.

15. The optical memory system of claim 13, wherein the light from the light source is divided into first divided lights by the global light distribution unit, and then each of the first divided lights is divided into the transmission light and the reception light by the input-output light distribution unit in each of the memory modules.

16. The optical memory system of claim 12, wherein the at least one light source comprises multiple light sources respectively assigned to the memory modules.

17. The optical memory system of claim 12, wherein at least one of the memory modules is a master memory module comprising an in-module light source.

18. An optical interface module comprising:
an input-output light distribution unit configured to divide received light to produce transmission light and reception light;
an electrical-to-optical conversion unit configured to perform optical modulation based on the transmission light and an electrical transmission signal to generate an optical transmission signal; and
a coherent optical-to-electrical conversion unit configured to perform a coherent reception based on the reception light and an optical reception signal to generate an electrical reception signal, wherein:
the electrical-to-optical conversion unit comprises multiple optical modulators, each optical modulator configured to generate a corresponding bit of the optical transmission signal based on the transmission light and a corresponding bit of the electrical transmission signal, and
the coherent optical-to-electrical conversion unit comprises multiple coherent receivers, each coherent receiver configured to generate a corresponding bit of the electrical reception signal based on the reception light and a corresponding bit of the optical reception signal.

* * * * *